United States Patent
Yamagishi et al.

(10) Patent No.: US 7,136,998 B2
(45) Date of Patent: Nov. 14, 2006

(54) SYSTEM AND METHOD FOR MANAGING CHANGES IN A PUBLIC KEY CERTIFICATE DIRECTORY

(75) Inventors: Yasuaki Yamagishi, Kanagawa (JP); Yoshihisa Gonno, Kanagawa (JP); Fumihiko Nishio, Tokyo (JP); Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 09/839,872

(22) Filed: Apr. 20, 2001

(65) Prior Publication Data

US 2002/0059519 A1    May 16, 2002

(30) Foreign Application Priority Data

Apr. 21, 2000    (JP)    .............................. 2000-120940

(51) Int. Cl.
*H04L 9/32*    (2006.01)
(52) U.S. Cl. ...................... 713/157; 713/155; 713/156; 713/158; 713/159
(58) Field of Classification Search ......... 713/155–159
See application file for complete search history.

(56) References Cited

U.S. PATENT DOCUMENTS

| | | | | |
|---|---|---|---|---|
| 4,309,569 A | * | 1/1982 | Merkle | ........................ 713/177 |
| 5,666,416 A | * | 9/1997 | Micali | ........................ 713/158 |
| 5,903,882 A | | 5/1999 | Asay et al. | |
| 6,097,811 A | * | 8/2000 | Micali | ........................ 713/186 |
| 6,226,743 B1 | * | 5/2001 | Naor et al. | ................. 713/177 |
| 6,442,689 B1 | * | 8/2002 | Kocher | ........................ 713/158 |

OTHER PUBLICATIONS

Stallings, William; Cryptography and Network Security; Second Edition; 1999; Prentice Hall, Inc.; Chapter 11.*
Naor M et al: "Certificate revocation and certificate update" Proceedings of the Usenix Security Symposium, Jan. 26, 1998, pp. 217-228, XP002238503.

* cited by examiner

*Primary Examiner*—Kambiz Zand
*Assistant Examiner*—Jung Kim
(74) *Attorney, Agent, or Firm*—Frommer Lawrence & Haug LLP; William S. Frommer; Thomas F. Presson

(57) ABSTRACT

Notification of lapse information of a public key certificate from a PKI directory server to a PKI directory client. Certificate authority information in a certificate authority structure is made to correspond to a container entry, end entity information is made to correspond to a leaf entry, and the certificate authority structure is assigned to a directory tree. If a certain certificate is lapsed and a certificate is newly issued, the newly issued certificate and its serial number are stored in the entry. After a predetermined time elapses, the certificate is put into a certain URL and the certificate stored in the entry is replaced with the URL information. At a receiver, a filtering mask is set on the basis of a certificate pass for obtaining the necessary certificate. A directory tree in which URL information and the serial number have been stored is repetitively transmitted from the transmission side. At the receiver, only the entries selected by the filtering mask are updated.

15 Claims, 27 Drawing Sheets

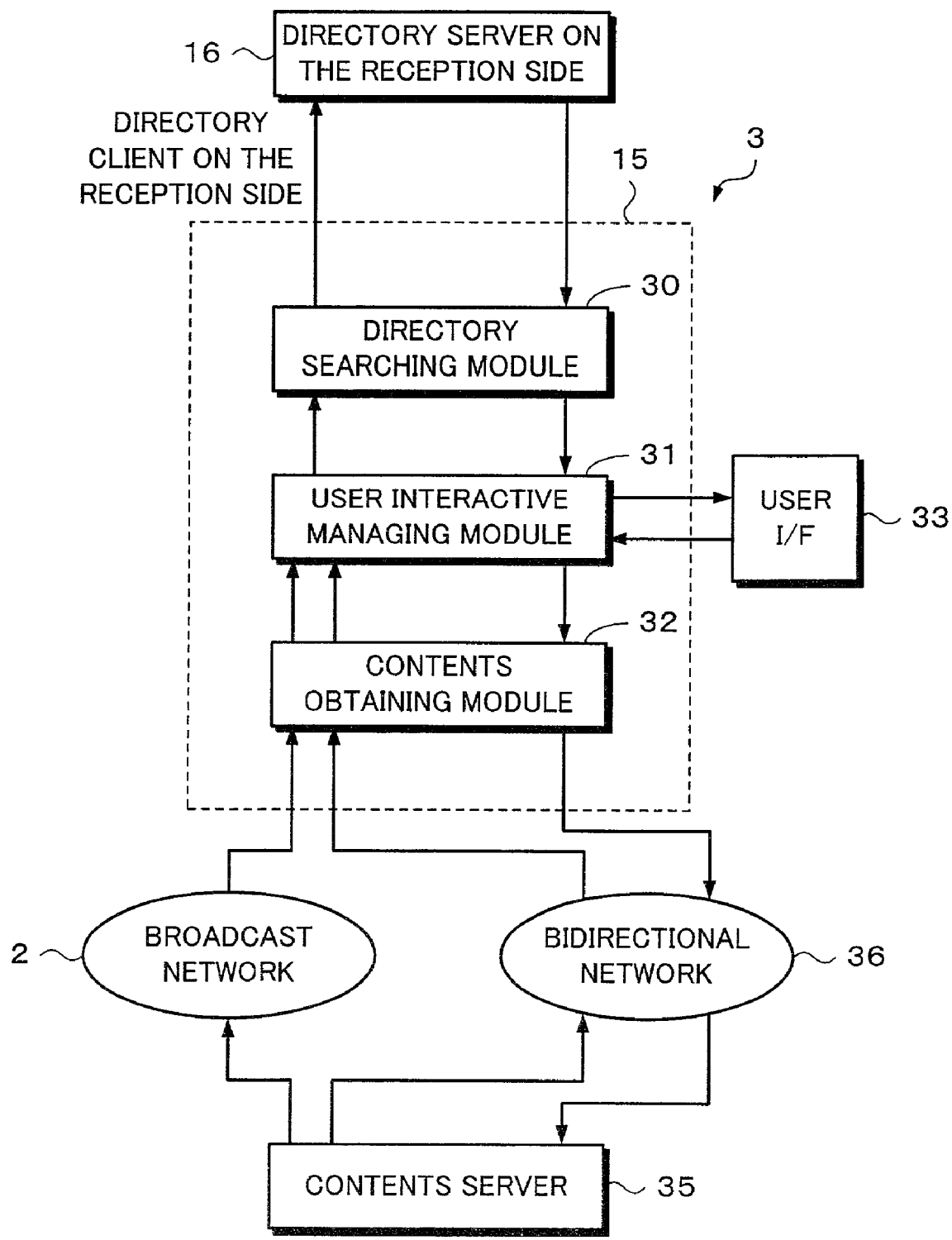

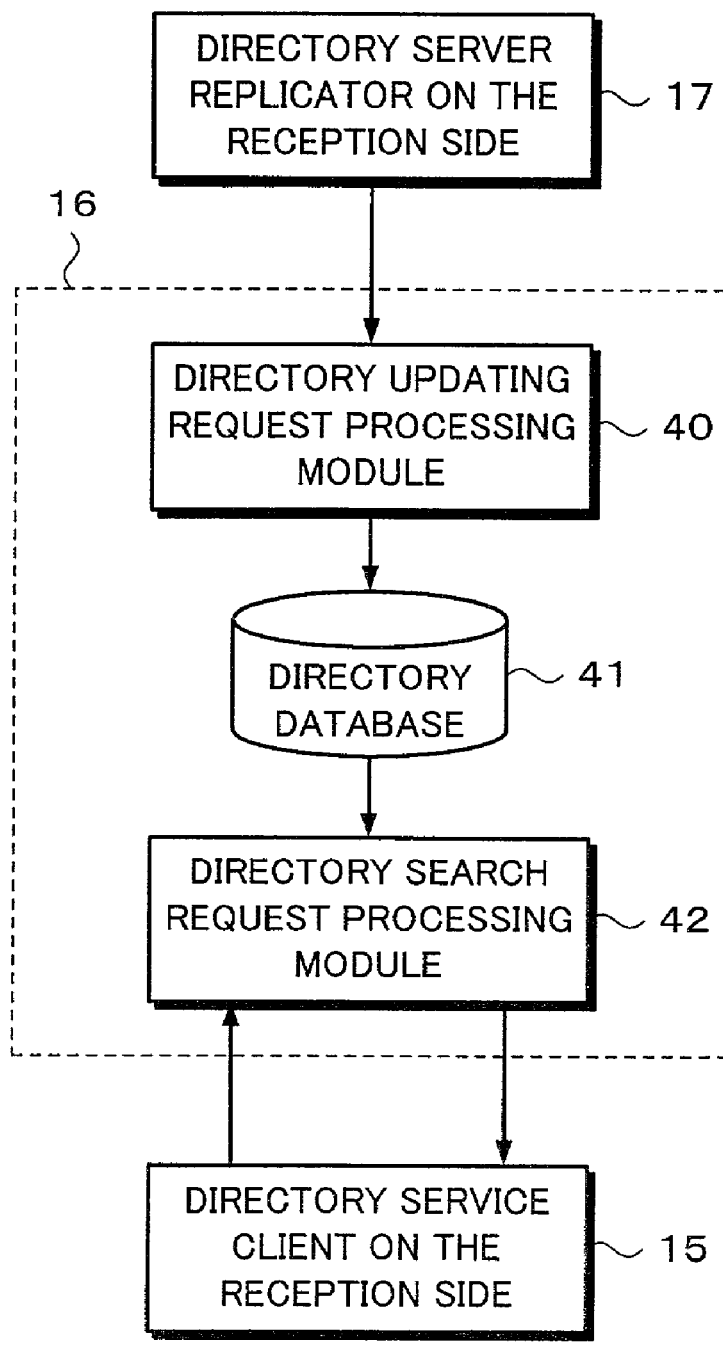

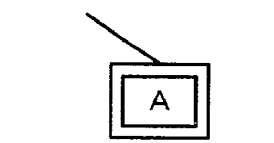
Fig. 9A
↓ (1, A, +B)
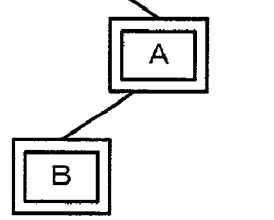
Fig. 9B
↓ (2, A, +a)
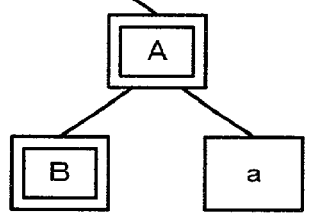
Fig. 9C
↓ (2, A, −a)
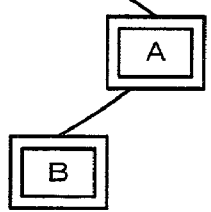
Fig. 9D
↓ (2, A, −B)
Fig. 9E
↓ (3, A, +C)
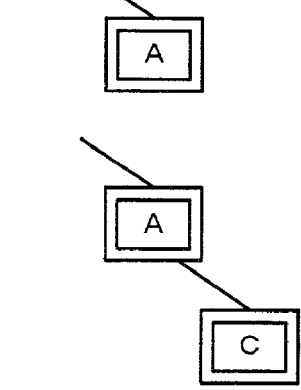
Fig. 9F (1, A, +B)
(1, A, +a)

(2, A, −a)
(2, B, +b)

(2, B, +C)
(2, C, +c)

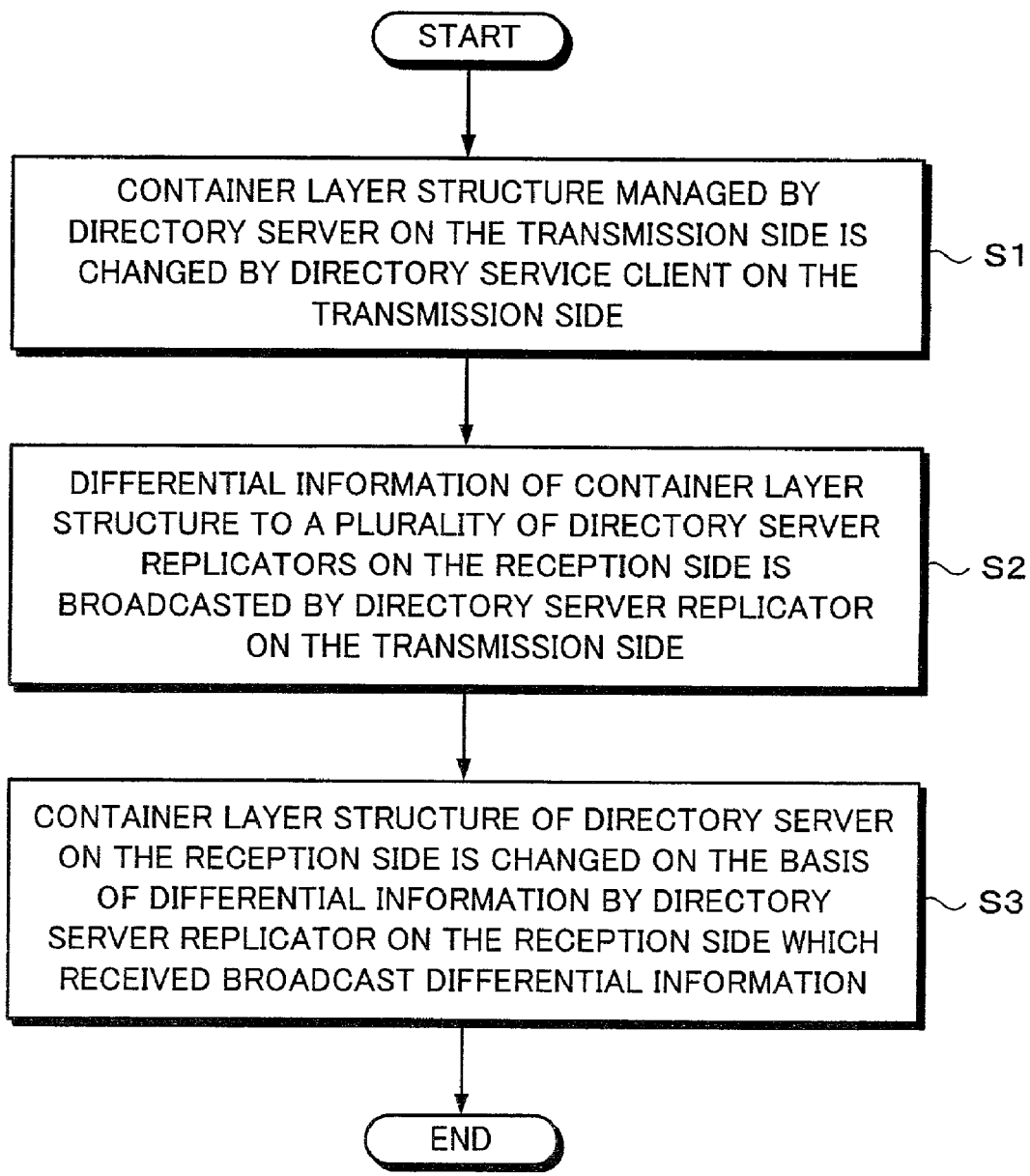

TRUSTED AS A ROOT CERTIFICATE AUTHORITY: ------▶
A PUBLIC KEY CERTIFICATE IS ISSUED: ———▶

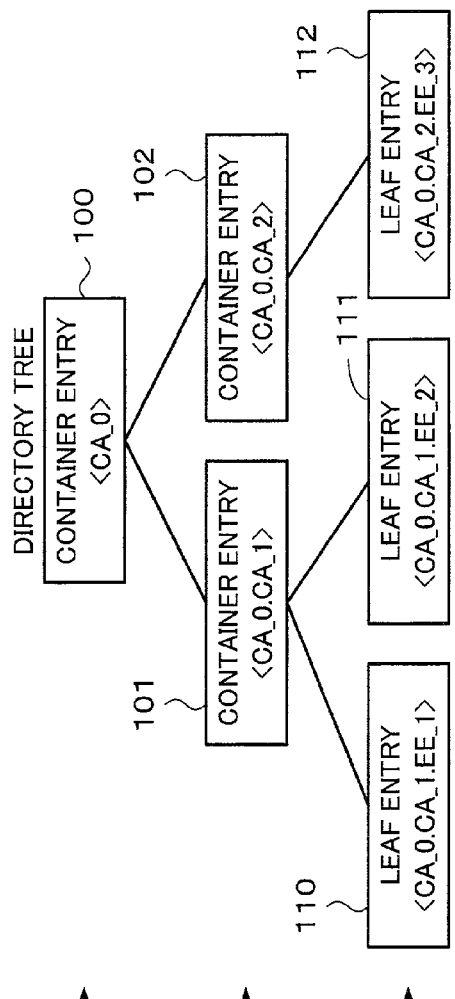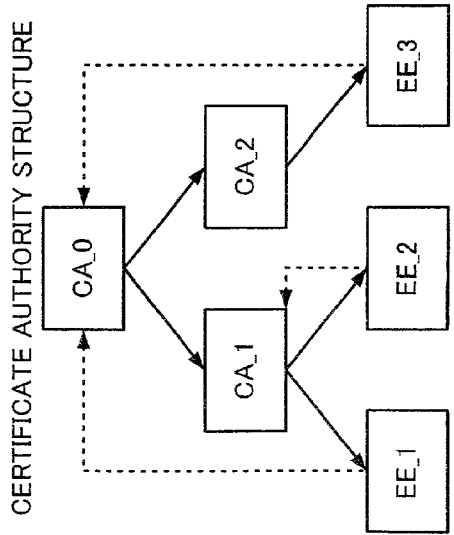

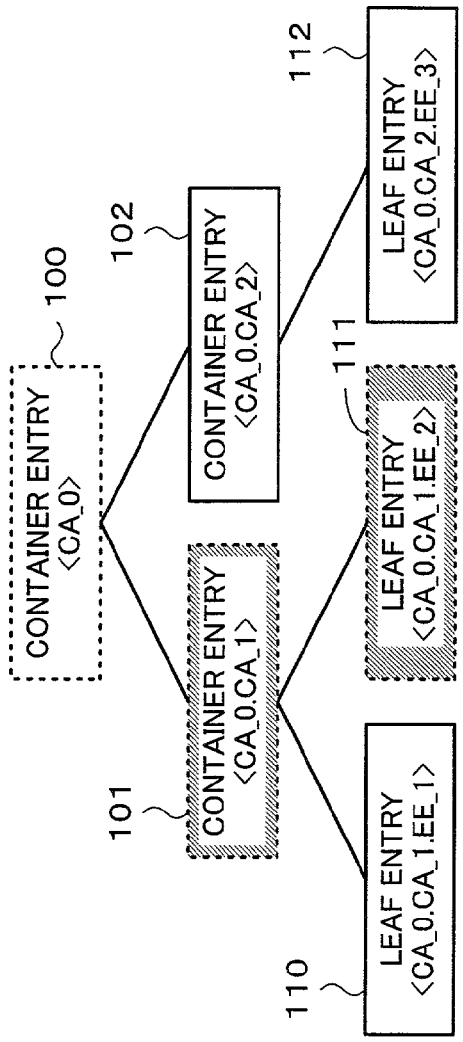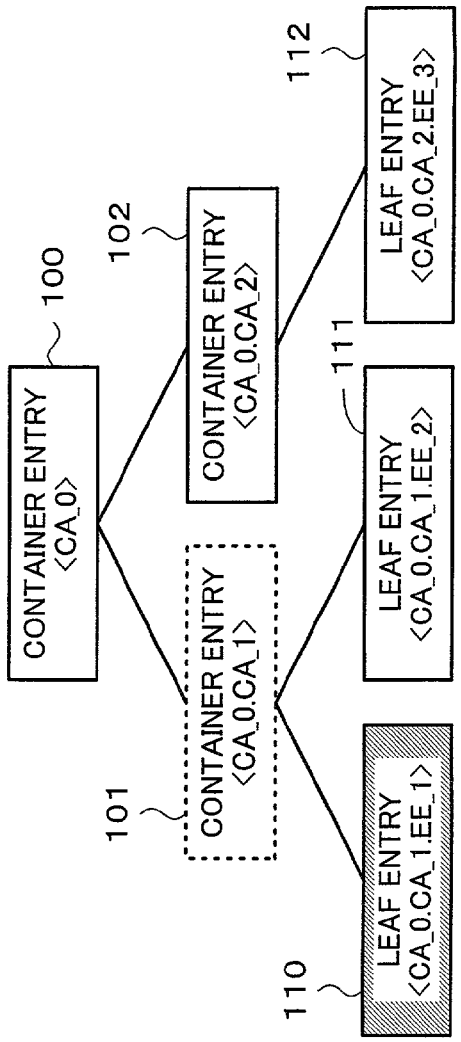
Fig. 27A
Fig. 27B

SYSTEM AND METHOD FOR MANAGING CHANGES IN A PUBLIC KEY CERTIFICATE DIRECTORY

BACKGROUND OF THE INVENTION

1. Field of the Invention

The invention relates to a transmitting apparatus, a transmitting method, a receiving apparatus, a receiving method, a transmitting and receiving system, and a transmitting and receiving method, in which in a system which has a layer structure and unidirectionally distributes data arranged on a network so as to be distributed thereon, a copy of a distributed public key directory entry is updated.

2. Description of the Related Arts

Various methods have been proposed as a data distributing method. For example, on the present Internet, a protocol using a TCP/IP (Transmission Control Protocol/Internet Protocol) such as an http (Hyper Text Transfer Protocol) as a basic protocol is used. In the TCP/IP, a call is generated from the reception side which receives data distribution to the transmission side of the data and, further, each time the data is transmitted and received, a connection is established between the transmission side and the reception side. Therefore, the data distribution at a high reliability can be performed.

On the other hand, there is a case where a load on the transmission side or the network increases and it is difficult to perform the efficient data distribution. That is, if the number of terminals which receive the presentation of data increases and accesses to a server which provides the data are concentrated, the server or network bears a large load and even if the terminal requests the data, it takes a long time until the data is obtained.

To solve such a problem, for example, there has been proposed a method of performing data distribution by using a satellite line or a CATV (Cable Television) line which can perform a simultaneous multi-address (multiple address) in a wide area, ground wave digital broadcast which will be put into practical use in the future, or the like. In this case, the load on the server or network is not influenced by an increase in number of terminals.

In recent years, owing to the development of a digital communication network such as Internet or the like, a large amount of data is accumulated onto the network and it is demanded to efficiently use such a large amount of data. For this purpose, attention is paid to a directory service for layer-managing data existing on the network so as to be distributed thereon and providing it to the users. By using the directory service, the user can rapidly find his own necessary information from information distributed and existing on the network and access it.

The directory service has been specified, for example, as X.500 series by the OSI (Open Systems Interconnection) or the like as an international standard. According to X.500, it has been defined with respect to the directory in a manner such that it is a set of open systems and each open system cooperatively has a logical database of information regarding a set of objects in the actual world.

According to the directory service by X.500, the information which the directory has can be searched or viewed. For example, a list represented by a phone book, authentication of the user, or the like is also provided by the directory service. Further, in the directory service, an object is named so that it can be easily learned by heart, presumed, and recognized, particularly, by the user as a human being.

The directory service by X.500 is extremely comprehensive, a program size is very large, and it is very difficult to realize such a service in the Internet in which the TCP/IP is used as a protocol. Therefore, a directory service like LDAP (Lightweight Directory Access Protocol) which is light weighted for the TCP/IP has been proposed.

In the case where the user uses the directory service, he can perform a filtering process for the directory. A filtering mask for performing the filtering process is set in accordance with a tendency of an access to the directory or with a favor of the user. For example, the filtering mask is set to a specific information genre in accordance with a favor of the user. The user can selectively access the directory information in which the filtering mask has been set. By executing the filtering process, the user does not need to keep unnecessary information.

In recent years, an example in which the directory service is performed in data transmitting means for performing the foregoing simultaneous multi-address, that is, the satellite line, CATV line, ground wave digital broadcast, or the like has been proposed. In this case, information by the directory service is unidirectionally provided and the information cannot be requested from the user side. Therefore, as directory information by the directory service, the same information is repetitively transmitted.

On the user side, the transmitted information is stored into, for example, an IRD (Integrated Receiver Decoder) or an STB (Set Top Box) as a receiver for digital broadcast which is used by being connected to a television receiver or the like. At this time, the filtering process is performed by using the foregoing filtering mask and the directory information according to a favor of the user is selectively stored. The filtering mask which is used for the filtering process is set on the user side.

The Internet as an open network always has a risk such as wiretapping of information, manipulation, or pretension. There is an authentication system to prevent such a risk. An environment serving as an infrastructure to operate the authentication system is called a PKI (Public Key Infrastructure). Attention is paid to the PKI as an infrastructure environment for operating encryption communication, E-mail, various settlement protocols, or the like on the Internet. It is considered that a success or failure in future EC (Electronic Commerce) on the Internet depends on the reliability of such an environment.

A public key encryption system which is used in the PKI is an asymmetrical encryption system in which two keys of a secret key and a public key are used and encoding and decoding are performed by these two different keys. A public key is formed from a secret key which the user himself holds and the public key can be handed to a partner. Data encrypted by the public key can be decoded only by the secret key corresponding thereto and data encrypted by the secret key can be decoded only by the public key corresponding thereto. A digital signature can be given by using such characteristics.

If only the public key is used, the foregoing "pretension" is possible. Therefore, by issuing a public key certificate (digital certificate) from a CA (Certificate Authority), a management of the public key and its authentication are performed. The public key certificate is issued, for example, by the following manner. The subscriber forms a pair of secret key and public key by a predetermined method and submits the public key to the CA. The CA confirms a status or the like of the subscriber, thereafter, gives a signature of the CA to information such as serial number of the certificate, name of the subscriber, public key, term of validity, and the like, and issues the public key certificate to which the CA previously gave a digital signature by using the open public key.

A construction of the public key certificate will now be described with reference to FIGS. 28A and 28B. FIG. 28A schematically shows a procedure of forming the public key certificate. The public key certificate comprises: information such as serial number, issuer (Certificate Authority) name, term of validity, name of holder, and the like (this information is referred to as certificate information here); a public key of the holder; and a signature by the CA in which a "finger print" obtained by converting the certificate information by a digest function has been encrypted by a secret key of the CA. The digest function is a function having features such that a long document is converted into a document of a predetermined short length and, even if the original information changes slightly, a conversion result largely differs. Therefore, a value obtained by the digest function is referred to a "finger print" of the original document.

FIG. 28B schematically shows a procedure for confirming the public key certificate formed as mentioned above. The "finger print" is obtained from the certificate information included in the public key certificate by the digest function. In the public key certificate, the signature annexed to the certificate information is decoded by the public key of the CA. A result of the decoding is compared with the "finger print". If they coincide, it is possible to determine that the public key certificate is a legal certificate which is not manipulated.

At present, it is promoted to fully equip a system such that the foregoing public key certificate which is positioned as an important function of the PKI is distributed and managed to the users distributed in a wide range. Hitherto, however, there is a problem such that a majority of users distributed in a wide range are effectively notified of the lapsed public key certificate is not established.

For example, in the case where the certificate was stolen, a person retired and lost the qualification of using the certificate, or the like, there is a situation such that the server side wants to invalidate the public key certificate without waiting for the term of validity which has been predetermined in the public key certificate.

In such a case, the serial number of the invalidated (lapsed) certificate, the date of lapse, and the like are registered into a system for distributing and managing the public key certificate, and at the time of an authentication procedure, an application which uses the public key certificate has to be made to confirm every time whether the target public key certificate is not lapsed or not. As a system for providing lapse information of the public key certificate, and further performing the distribution, management, and lapse collation of the public key certificate itself, an online lapse information collation service (PKI directory service) is considered.

In the PKI directory service, if the number of clients (applications which collate the lapsed information of the certificate) becomes a majority, there is a fear that the system is broken due to an increase in load of query. Therefore, a method whereby copies of the original PKI directory server are formed in a plurality of distributed PKI directory servers and the load of query is distributed is used. However, in case of forming the copy, although the necessity of updating and managing them to the latest information is caused, there is a problem such that if the number of copies becomes very large, it is difficult to update and manage them.

OBJECTS AND SUMMARY OF THE INVENTION

It is, therefore, an object of the invention to provide a transmitting apparatus, a transmitting method, a receiving apparatus, a receiving method, a transmitting and receiving system, and a transmitting and receiving method, in which lapse information of a public key certificate can be efficiently notified from a PKI directory server to a PKI directory client.

According to the first aspect of the invention, to solve the above problems, there is provided a transmitting apparatus for transmitting a layer structure of a directory which manages public key certificate information in a layer manner, comprising: managing means for making certificate authority information correspond to a container entry which can store its own subordinate information, making end entity information correspond to a leaf entry which is under domination of the container entry and cannot store its own subordinate information, and managing a layer structure of a directory constructed by the container entry and the leaf entry; detecting means for detecting a change of the layer structure of the directory which is managed by the managing means and obtaining differential information constructed by a difference of the change of the layer structure of the directory on the basis of a detection result; and transmitting means for transmitting the differential information detected by the detecting means, wherein information which can obtain latest public key certificate information and lapse information of the latest public key certificate information are stored into the container entry and/or the leaf entry.

According to the second aspect of the invention, there is provided a transmitting method of transmitting a layer structure of a directory which manages public key certificate information in a layer manner, comprising: a managing step of making certificate authority information correspond to a container entry which can store its own subordinate information, making end entity information correspond to a leaf entry which is under domination of the container entry and cannot store its own subordinate information, and managing a layer structure of a directory constructed by the container entry and the leaf entry; a detecting step of detecting a change of the layer structure of the directory which is managed by the managing step and obtaining differential information constructed by a difference of the change of the layer structure of the directory on the basis of a detection result; and a transmitting step of transmitting the differential information detected by the detecting step, wherein information which can obtain latest public key certificate information and lapse information of the latest public key certificate information are stored into the container entry and/or the leaf entry.

According to the third aspect of the invention, there is provided a receiving apparatus for receiving a transmitted layer structure of a directory which manages public key certificate information in a layer manner, comprising: receiving means for making transmitted certificate authority information correspond to a container entry which can store its own subordinate information, making end entity information correspond to a leaf entry which is under domination of the container entry and cannot store its own subordinate information, and receiving differential information comprising a difference of a change of a layer structure of a directory which is constructed by the container entry and the leaf entry and obtained on the basis of a detection result obtained by detecting the change of the layer structure of the directory; managing means for managing the layer structure of the directory constructed on the basis of the differential information received by the receiving means; and changing means for selectively fetching the differential information and changing the layer structure of the directory which is managed by the managing means, wherein information which can obtain latest public key certificate information and lapse information of the latest public key certificate information are stored into the container entry and/or the leaf entry and transmitted.

According to the fourth aspect of the invention, there is provided a receiving method of receiving a transmitted layer structure of a directory which manages public key certificate information in a layer manner, comprising: a receiving step of making transmitted certificate authority information correspond to a container entry which can store its own subordinate information, making end entity information correspond to a leaf entry which is under domination of the container entry and cannot store its own subordinate information, and receiving differential information comprising a difference of a change of a layer structure of a directory which is constructed by the container entry and the leaf entry and obtained on the basis of a detection result obtained by detecting the change of the layer structure of the directory; a managing step of managing the layer structure of the directory constructed on the basis of the differential information received by the receiving step; and a changing step of selectively fetching the differential information and changing the layer structure of the directory which is managed by the managing step, wherein information which can obtain latest public key certificate information and lapse information of the latest public key certificate information are stored into the container entry and/or the leaf entry and transmitted.

According to the fifth aspect of the invention, there is provided a transmitting and receiving system for transmitting a layer structure of a directory which manages public key certificate information in a layer manner and receiving the transmitted layer structure of the directory, comprising: first managing means for making certificate authority information correspond to a container entry which can store its own subordinate information, making end entity information correspond to a leaf entry which is under domination of the container entry and cannot store its own subordinate information, and managing a layer structure of a directory constructed by the container entry and the leaf entry; detecting means for detecting a change of the layer structure of the directory which is managed by the first managing means and obtaining differential information constructed by a difference of the change of the layer structure of the directory on the basis of a detection result; transmitting means for transmitting the differential information detected by the detecting means; receiving means for receiving the differential information transmitted by the transmitting means; second managing means for managing the layer structure of the directory constructed on the basis of the differential information received by the receiving means; and changing means for selectively fetching the differential information and changing the layer structure of the directory which is managed by the second managing means, wherein information which can obtain latest public key certificate information and lapse information of the latest public key certificate information are stored into the container entry and/or the leaf entry.

According to the sixth aspect of the invention, there is provided a transmitting and receiving method of transmitting a layer structure of a directory which manages public key certificate information in a layer manner and receiving the transmitted layer structure of the directory, comprising: a first managing step of making certificate authority information correspond to a container entry which can store its own subordinate information, making end entity information correspond to a leaf entry which is under domination of the container entry and cannot store its own subordinate information, and managing a layer structure of a directory constructed by the container entry and the leaf entry; a detecting step of detecting a change of the layer structure of the directory which is managed by the first managing step and obtaining differential information constructed by a difference of the change of the layer structure of the directory on the basis of a detection result; a transmitting step of transmitting the differential information detected by the detecting step; a receiving step of receiving the differential information transmitted by the transmitting step; a second managing step of managing the layer structure of the directory constructed on the basis of the differential information received by the receiving step; and a changing step of selectively fetching the differential information and changing the layer structure of the directory which is managed by the second managing step, wherein information which can obtain latest public key certificate information and lapse information of the latest public key certificate information are stored into the container entry and/or the leaf entry.

As mentioned above, according to the invention of claims 1 and 5, the certificate authority information is made to correspond to the container entry which can store its own subordinate information. The end entity information is made to correspond to the leaf entry which is under domination of the container entry and cannot store its own subordinate information. The layer structure of the directory constructed by the container entry and the leaf entry is managed. The differential information which is obtained on the basis of the detection result of the change of the managed layer structure of the directory and constructed by the difference of the change of the layer structure of the directory is transmitted. The information which can obtain the latest public key certificate information and the lapse information of the latest public key certificate information are stored into the container entry and/or the leaf entry. Therefore, on the reception side, whether the public key certificate information which the reception side has is the latest information or not can be known. If it is determined that the public key certificate information which the reception side has is not the latest information, the latest public key certificate information can be obtained.

According to the invention of claims 6 and 9, the transmitted certificate authority information is made to correspond to the container entry which can store its own subordinate information. The end entity information is made to correspond to the leaf entry which is under domination of the container entry and cannot store its own subordinate information. The differential information comprising the difference of the change of the layer structure of the directory which is constructed by the container entry and the leaf entry and obtained on the basis of the detection result obtained by detecting the change of the layer structure of the directory is received. The layer structure of the directory constructed on the basis of the received differential information is changed on the basis of the differential information which was selectively fetched. The information which can obtain the latest public key certificate information and the lapse information of the latest public key certificate information are stored into the container entry and/or the leaf entry and transmitted. Therefore, whether the public key certificate information is the latest information or not can be known. If it is determined that the public key certificate information is not the latest information, the latest public key certificate information can be obtained.

According to the invention of claims 10 and 15, on the transmission side, the certificate authority information is made to correspond to the container entry which can store its own subordinate information, the end entity information is made to correspond to the leaf entry which is under domination of the container entry and cannot store its own subordinate information, the change of the layer structure of the directory constructed by the container entry and the leaf entry is detected, and the differential information comprising the difference of the change of the layer structure of the directory obtained on the basis of the detection result is transmitted. On the reception side, the transmitted differential information is received, the layer structure of the directory constructed on the basis of the received differential information is changed by the differential information which was selectively fetched, and the information which can obtain the latest public key certificate information and the lapse information of the latest public key certificate information are stored into the container entry and/or the leaf entry and transmitted. On the reception side, therefore, whether the public key certificate information which the reception side has is the latest information or not can be known. If it is determined that the public key certificate information which the reception side has is not the latest information, the latest public key certificate information can be obtained.

The above and other objects and features of the present invention will become apparent from the following detailed description and the appended claims with reference to the accompanying drawings.

BRIEF DESCRIPTION OF THE DRAWINGS

FIG. 7 is a functional block diagram for explaining functions of a reception side client;

FIG. 8 is a functional block diagram for explaining functions of a reception side server;

FIGS. 9A to 9F are schematic diagrams for explaining differential updating information of the directory structure;

FIG. 11 is a flowchart for explaining a sync managing method of the container entries;

FIGS. 24A and 24B are schematic diagrams showing correspondence relations of examples between the certificate authority structure and a directory tree;

FIGS. 27A and 27B are diagrams for explaining which filtering mask is stored into each target mask list.

DETAILED DESCRIPTION OF THE PREFERRED EMBODIMENTS

Figure 1:
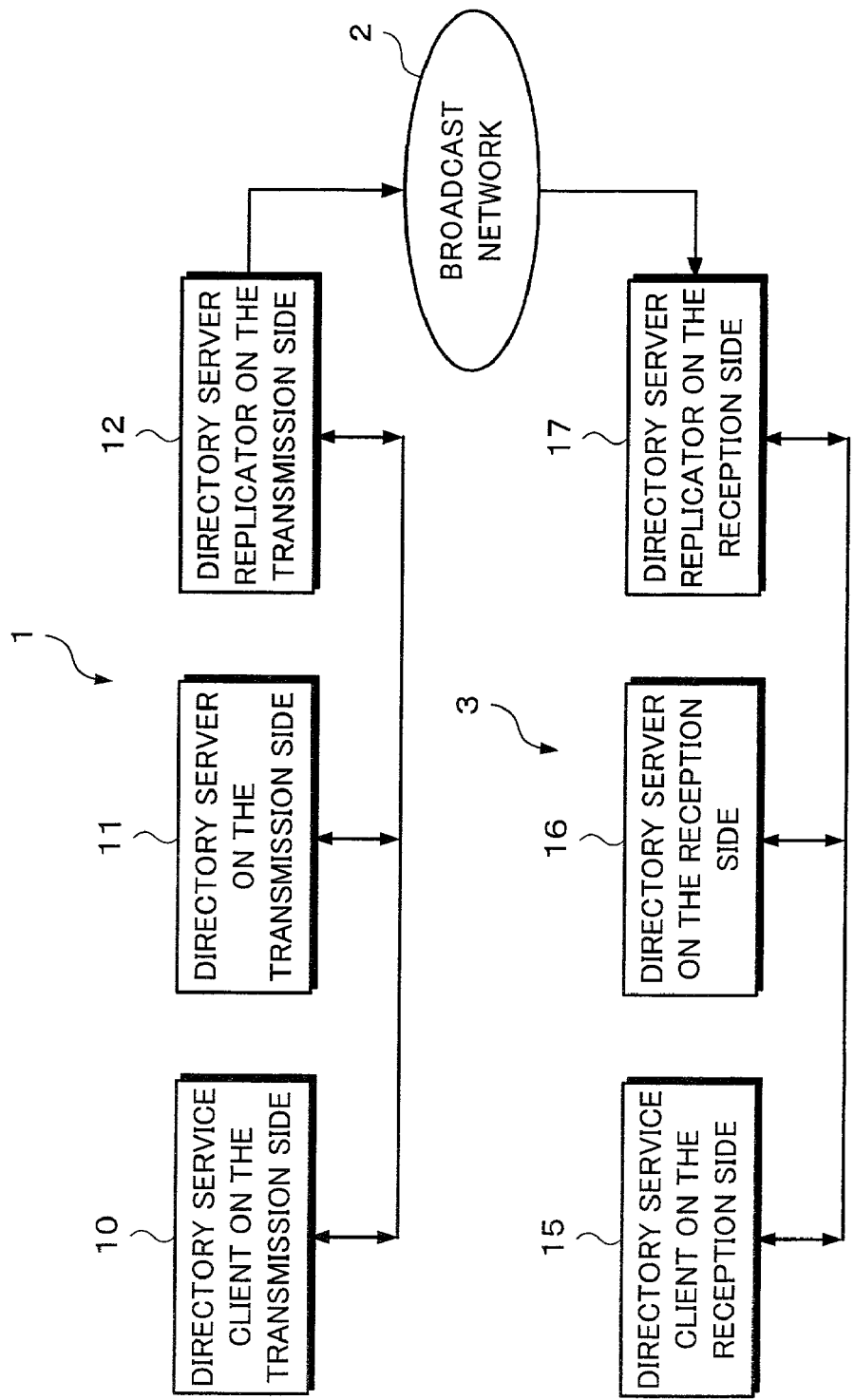
FIG. 1 is a schematic diagram showing an example of a system which can be applied to the invention.
Figure 2:
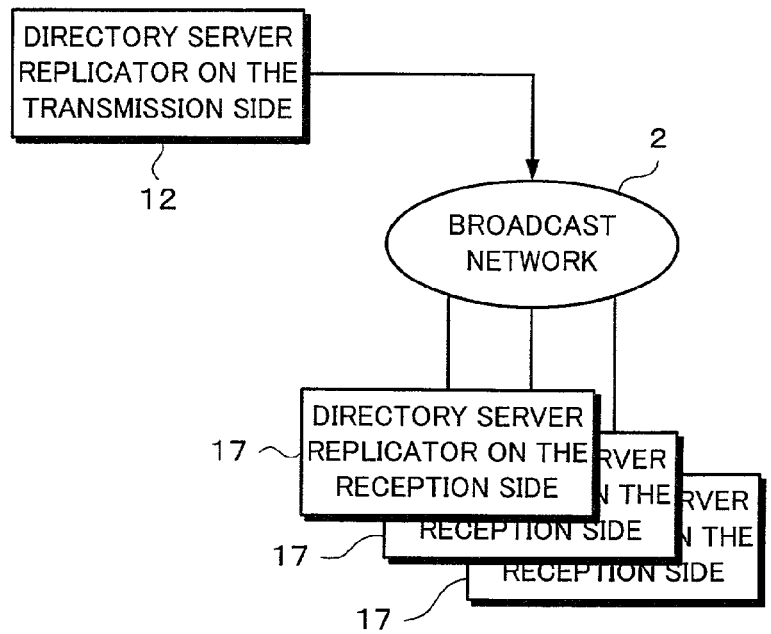
FIG. 2 is a schematic diagram for explaining that a plurality of reception sides are connected to a broadcast network.

An embodiment of the invention will now be described hereinbelow. First, for easy understanding, a directory service which can be applied to the invention will be described prior to explaining the embodiment of the invention. FIG. 1 shows an example of a system which can be applied to the invention. A transmission side 1 arranges a number of contents existing on a network (not shown) such as Internet, broadcast network, or the like into a layer structure in a tree shape and manages them as a directory structure. On the transmission side 1, directory information showing the directory structure is transmitted to a broadcast network 2. A number of reception sides 3 are connected to the broadcast network 2 as shown in an example in FIG. 2 and each reception side can receive broadcast performed through the broadcast network 2. The reception sides 3 can receive the directory information broadcasted by the broadcast network 2, refer to the received directory information, select necessary information from a number of information existing on the broadcast network 2 or another network, and obtain it.

As shown in an example in FIG. 1, the transmission side 1 comprises: a directory service client 10 on the transmission side (hereinafter, abbreviated to a transmission side client 10); a directory server 11 on the transmission side (hereinafter, abbreviated to a transmission side server 11); and a directory server replicator 12 on the transmission side (hereinafter, abbreviated to a transmission side replicator 12). The transmission side client 10, transmission side server 11, and transmission side replicator 12 are mutually connected by a network such as Internet or the like and mutually perform communication.

The transmission side client 10 is, for example, a contents provider which provides contents by a network (not shown)

or the like and changes or updates the directory structure. The transmission side client 10 can be also located at any position on the network. The transmission side server 11 performs a contents collation, change, or the like of the transmission side client 10 and manages the directory structure. The transmission side server 11 can be constructed so as to be distributed on the network. The transmission side replicator 12 monitors the directory structure managed by the transmission side server 11 and detects the updating of the directory structure. On the basis of a detection result, the transmission side replicator 12 compares the structure before updating with the structure after the updating, extracts a difference between them, and constructs differential updating information of the directory structure. The differential updating information is transmitted to the broadcast network 2. The construction of the differential updating information will be described hereinlater.

The reception side 3 comprises: a directory server replicator 17 on the reception side (hereinafter, abbreviated to a reception side replicator 17); a directory server 16 on the reception side (hereinafter, abbreviated to a reception side server 16); and a directory service client 15 on the reception side (hereinafter, abbreviated to a reception side client 15). The reception side 3 is, for example, a personal computer or the STB, IRD, or the like mentioned in the background art. The reception side client 15 is application software such as a WWW (World Wide Web) browser or the like which can access to the directory structure and obtain and display data of a plurality of different formats. The reception side server 16 comprises a local database and the directory information is stored therein.

The directory information, updating information of the directory structure, the differential information of the updating information, and the like which were transmitted by the broadcast network 2 are received by the reception side replicator 17. On the basis of the received information, the reception side replicator 17 updates the database stored in the reception side server 16, thereby reconstructing the directory structure. For example, the reception side client 15 requests necessary information from the reception side replicator 17 in response to an instruction of the user. On the basis of the request, the reception side replicator 17 searches the database in the reception side server 16 and returns, for example, an address of the requested information to the reception side client 15. The reception side client 15 can access to, for example, the information existing on the network (not shown) on the basis of this address.

Figure 3:
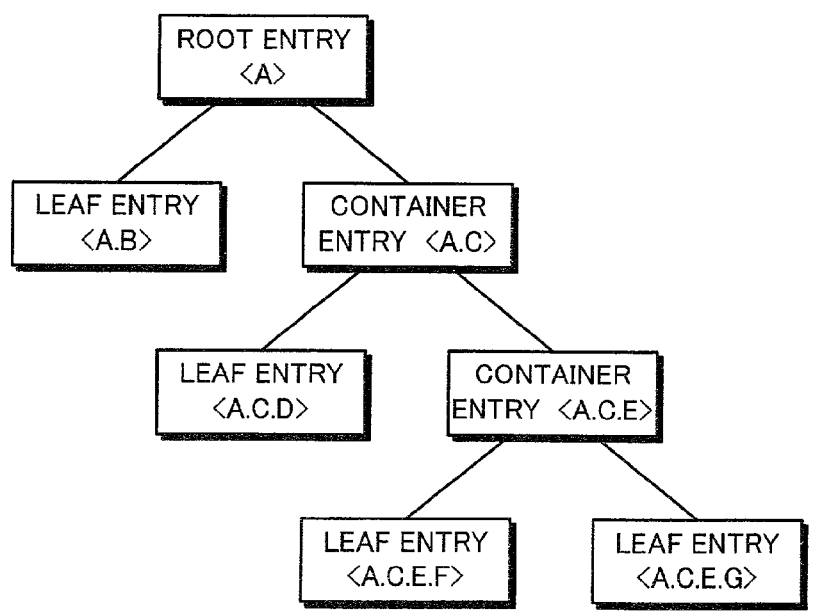
FIG. 3 is a schematic diagram for explaining a directory structure.

The directory structure will be described with reference to FIG. 3. As shown in the diagram, the directory comprises a layer structure in a tree shape. Each node of the tree is referred to as an entry and information is stored into each entry. As entries, three kinds of entries such as root entry, container entry, and leaf entry are defined. The container entry is an entry which can further contain subordinate entries. A layer constructed by the container entry is hereinafter referred to as a container layer.

Entries other than the container entry are referred to as leaf entries. The leaf entry is an end node which cannot contain any subordinate entry. The layer by the leaf entry is referred to as a leaf layer hereinbelow. The leaf layer is constructed under domination of the container entry.

The highest entry of the directory tree is referred to as a root entry and is an entry showing the whole world which is completed by the directory structure. It is assumed hereinbelow that the root entry has at least one subordinate leaf entry or container entry.

The entry has a plurality of attributes. Among the attributes which the entry has, the name which is unconditionally identified by the directory tree is referred to as an entry name. The position of the entry on the directory structure can be specified by the entry name. In the example of FIG. 3, an entry name A is assigned to the root entry. As entries under direct domination of the root entry, entry names A and B are assigned to the leaf entries shown on the left side in the diagram and entry names A and C are assigned to the container entries on the right side, respectively. The entries are hereinafter partitioned by periods in order of tracing the layer structure from the root entry and the entry name is assigned to each entry.

Figure 4A:
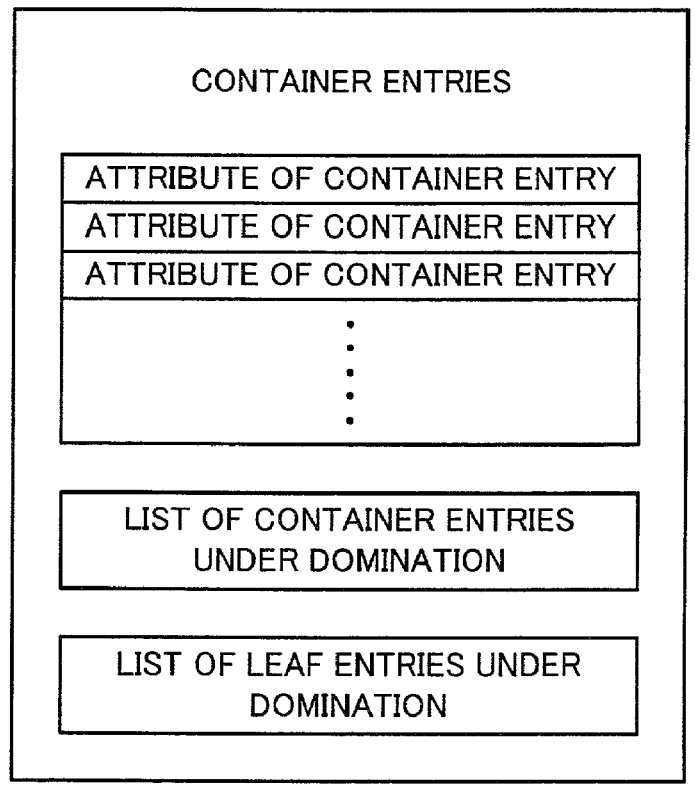
FIGS. 4A and 4B are schematic diagrams showing an example of a structure of container entries.
Figure 4B:
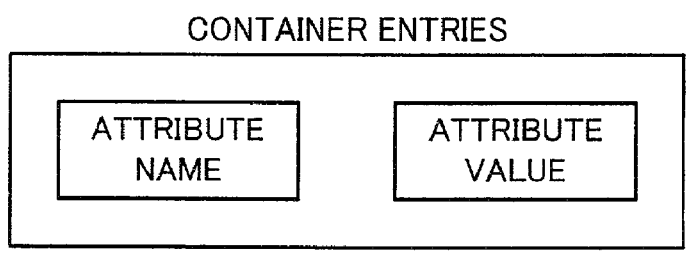

FIGS. 4A and 4B show an example of structures of container entries. The container entry has an attribute of the container entry itself and lists of its own subordinate container entries and leaf entries. It is also possible that the list of the subordinate entries does not include any element. As shown in the diagram, the container entry can have a plurality of attributes of the container entry itself. As shown in FIG. 4B, the attribute of the container entry comprises an attribute name and an attribute value.

Figure 5A:
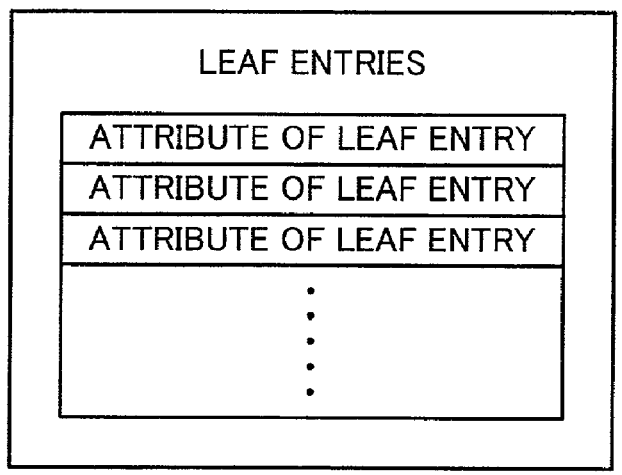
FIGS. 5A and 5B are schematic diagrams showing an example of a structure of leaf entries.
Figure 5B:
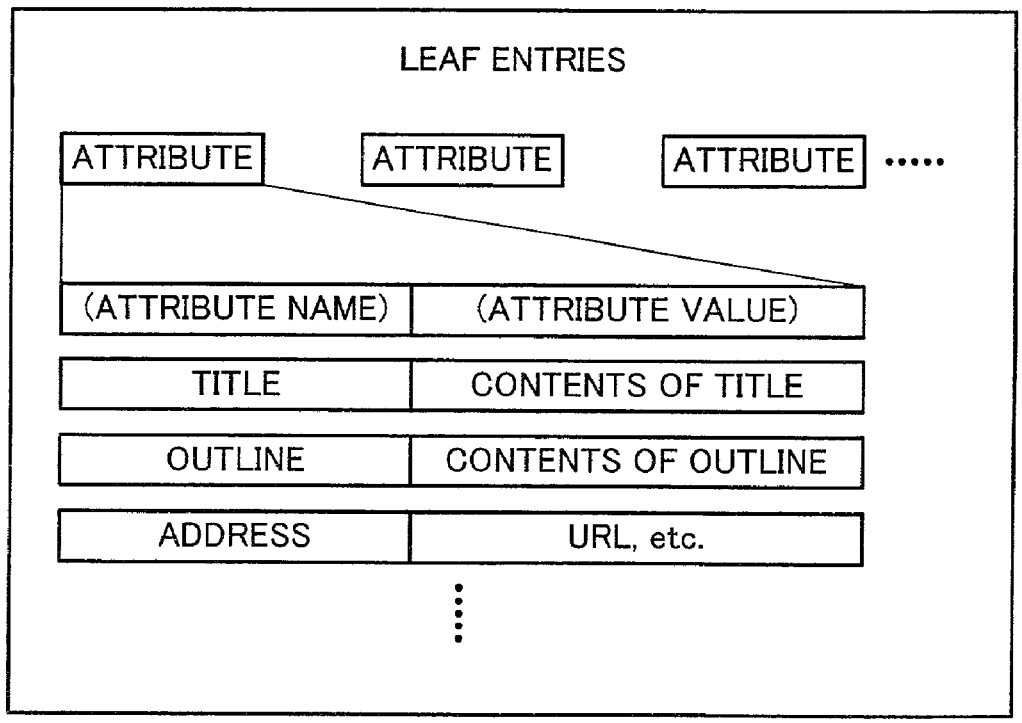

FIGS. 5A and 5B show an example of structures of leaf entries. As shown in FIG. 5A, the leaf entry has a plurality of attributes of the leaf entry. FIG. 5B shows a more specific example of the attributes of the leaf entry. Each attribute comprises an attribute name and an attribute value. For example, when the leaf entry is search information of the contents, there is an address as one attribute name and address information of the contents such as URL (Uniform Resource Locator) or the like showing the location on the Internet is described as an attribute value.

The directory structure is constructed by, for example, sorting the container entries and arranging them in a tree shape in accordance with, for example, an information genre under the root entry indicative of the whole world which is completed by the directory structure.

The construction on the transmission side 1 will be described more in detail. As for the constructions which have already been described in FIGS. 3 to 5B, the directory structure is managed on the transmission side server 11. The transmission side client 10 performs a change or the like to the directory structure managed by the transmission side server 11 in accordance with the contents which are provided. The change performed to the transmission side server 11 is monitored by the transmission side replicator 12.

Figure 6:
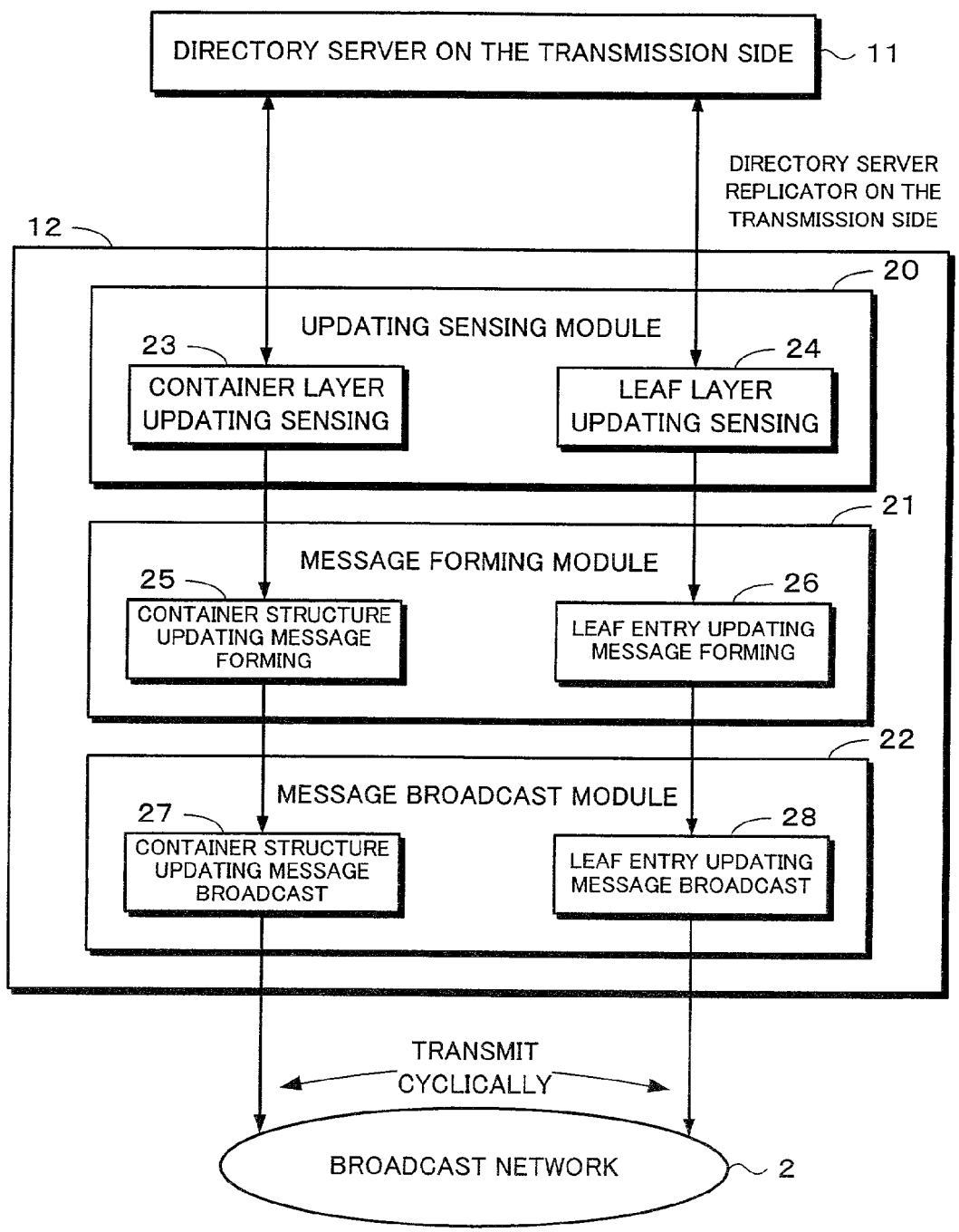
FIG. 6 is a functional block diagram for explaining functions of a transmission side replicator.

FIG. 6 is a functional block diagram for explaining functions of the transmission side replicator 12. For example, the transmission side replicator 12 can be constructed by a general computer system and comprises: a CPU (Central Processing Unit); a recording and memory medium such as memory, hard disk, or the like; communicating means; a timer; a user interface; and the like. The functional block shown in FIG. 6 is realized by application software which operates on the CPU. Each module is a functional unit on the application software and comprises software.

The transmission side replicator 12 comprises an updating sensing module 20, a message forming module 21, and a message broadcast module 22. Each of the modules 20, 21, and 22 has a module for performing processes regarding the container layer and a module for performing processes regarding the leaf layer.

The updating sensing module 20 is a module for detecting whether there is a change in the directory structure managed on the server 11 or not with reference to the transmission side server 11 and comprises a container layer updating sensing module 23 and a leaf layer updating sensing module 24. The container layer updating sensing module 23 monitors the transmission side server 11 and detects a change in structure of the container layer. The leaf layer updating sensing module 24 monitors the transmission side server 11 and detects a change in structure of the leaf layer and a change in contents of the leaf entry.

The message forming module 21 is a module for forming a message in which the differential updating information of the directory structure is shown on the basis of a detection result of the change in directory structure by the updating sensing module 20 and comprises: a container structure updating message forming module 25; and a leaf entry updating message forming module 26. The container structure updating message forming module forms a message in which the differential updating information regarding the structure change in the container layer is shown on the basis of a detection result of the container layer updating sensing module 23. The leaf entry updating message forming module 26 forms a message in which the updating information in the leaf layer is shown on the basis of a sensing result of the leaf layer updating sensing module 24.

The message broadcast module 22 is a module for broadcasting the message formed by the message forming module 21 to the broadcast network 2 and comprises a container structure updating message broadcast module 27 and a leaf entry updating message broadcast module 28. The container structure updating message broadcast module 27 broadcasts the message formed by the container structure updating message forming module 25 mentioned above. The leaf entry updating message broadcast module 28 broadcasts the message formed by the leaf entry updating message forming module 26 mentioned above. The broadcast of the message from the message broadcast module 22 to the broadcast network 2 is performed by cyclically transmitting the same message only a predetermined number of times.

The construction on the reception side 3 will now be more specifically explained. FIG. 7 is a functional block diagram for explaining functions of the reception side client 15. The reception side client 15 can be constructed by, for example, a general computer system and comprises: a CPU (Central Processing Unit); a recording and memory medium such as memory or hard disk; communicating means; a user interface; and the like. The functional block shown in FIG. 7 is realized by application software which operates on the CPU and each module is a functional unit on the application software and comprises software.

As mentioned above, the reception side client 15 is, for example, a WWW browser and can unitedly display and reproduce supplied contents, for example, image data, text data, audio data, and motion image data. The foregoing display and reproduction can be controlled on the basis of instructions inputted by the user by using predetermined input means.

The reception side client 15 comprises a directory searching module 30, a user interactive managing module 31, and a contents obtaining module 32. A user interface 33 comprising, for example, text input means such as a keyboard, a pointing device such as a mouse, a display apparatus, and the like is connected to the user interactive managing module 31. The input of a contents search request from the user to the reception side client 15 is performed to the user interactive managing module 31 in an interactive manner by using the user interface 33.

When the contents search request is inputted to the user interactive managing module 31, a request for searching the directory entry corresponding to the contents is issued from the user interactive managing module 31 to the directory searching module 30 in order to search an address of the contents. The directory searching module 30 sends a directory entry search request to the reception side server 16 in response to the search request.

A search result of the directory entry based on the search request in the reception side server 16 is returned to the directory searching module 30. The search result is returned from the directory searching module 30 to the user interactive managing module 31. For example, if the search result indicates the leaf entry, address information of the contents as one of the attributes is extracted from the directory entry information of the search result. A contents obtaining request is issued from the user interactive managing module 31 to the contents obtaining module 32 so as to obtain the contents shown by the extracted address information.

The contents obtaining module 32 sends an obtaining request of the contents to a contents server 35 on the basis of the received contents obtaining request. The contents server 35 is a server which is connected to the reception side client 15 through a bidirectional network 36 such as Internet and provides the contents to the user. The contents can be also provided through the bidirectional network 36 or provided by the broadcast network 2.

The contents obtained from the contents server 35 on the basis of the contents obtaining request is supplied to the contents obtaining module 32 through, for example, the bidirectional network 36 and returned from the contents obtaining module 32 to the user interactive managing module 31. The user interactive managing module 31 outputs the received contents to the user interface 33.

If the requested contents is transmitted by the broadcast network 2, the contents obtaining module 32 can also directly obtain desired contents which is broadcasted by the broadcast network 2 on the basis of the contents obtaining request.

FIG. 8 is a functional block diagram for explaining functions of the reception side server 16. Although an explanation is omitted, the reception side server 16 is also constructed by a general computer system in a manner similar to the foregoing reception side client 15. The reception side server 16 comprises a directory updating request processing module 40, a directory database 41, and a directory search request processing module 42.

The directory information based on the directory structure which is managed by the transmission side server 11 has been stored in the directory database 41. As mentioned above, the reception side replicator 17 receives the differential updating information of the directory structure transmitted from the transmission side 1 through the broadcast network 2. Although the details will be explained hereinlater, a request is issued from the reception side replicator 17 to the directory updating request processing module 40 so as to update the directory information stored in the directory database 41 on the basis of the differential updating information. The directory updating request processing module 40 updates the directory information stored in the directory database 41 by using the differential updating information on the basis of this request.

The search request of the directory entry from the reception side client 15 mentioned above is received by the directory search request processing module 42. The directory database 41 is searched by the directory search request processing module 42 on the basis of the received search request. The address information in the directory entry obtained as a result of the search, for example, in the leaf entry is returned from the directory search request processing module 42 to the reception side client 15.

By constructing the system as mentioned above, the user can search the directory information by the reception side client 15 and obtain the address information by which the desired contents is provided as a search result. The user can obtain desired contents on the basis of the obtained address information. The directory structure is always monitored by the transmission side replicator 12. When a change occurs in the directory structure, the differential updating information of the directory structure in association with the change is supplied to the reception side replicator 17 through the broadcast network 2. On the user side, the directory information stored in the directory database 41 is changed by the reception side replicator 17 on the basis of the supplied differential updating information. Therefore, the user can always hold the directory information synchronized with the actual directory structure into the directory database 41.

The differential updating information of the directory structure which is formed in association with the change in directory structure will now be described with reference to FIGS. 9A to 9F and 10A to 10D. In the following description, a process for adding or deleting a container entry C or a leaf entry 1 under domination of a container entry X in a certain container layer which is specified by a schema version Sv is described by (Sv, X, [+/−] [C/1])

This description showing the process for the directory structure expresses a difference between the directory structure changed due to the process by such a description and the original structure and can be used as differential updating information.

The schema version Sv indicates a value which is changed in association with the change in directory structure. The container entry X (or C) is a container entry name and expressed by an alphabet of a capital letter. The leaf entry 1 indicates a leaf entry name and expressed by an alphabet of a small letter. The addition of the entry is expressed by [+] and the deletion is expressed by [−]. A slash symbol in the parentheses [ ] indicates that either one of the entries written on both sides of the slash symbol is described. In FIGS. 9A to 10D, a rectangle shown by double lines indicates the container entry and a rectangle shown by a single line indicates the leaf entry. As a root entry, only a connecting line is shown and the main body is omitted.

In FIG. 9A, only a container entry A exists under domination of the root entry (not shown). This state is presumed to be the schema version Sv=1. In this state, a process of (1, A, +B) is executed in accordance with the above description. That is, a container entry B is added under domination of the container entry A. Thus, a directory structure as shown in FIG. 9B is obtained. since the container entry B is added to the state of FIG. 9A, it is assumed that the layer image of the container entry has been changed and the schema version is set to (Sv=2).

In the state of FIG. 9B, a process of (2, A, +a) is further executed. That is, a leaf entry a is added under domination of the container entry A. Thus, a directory structure as shown in FIG. 9C is obtained. In the state of FIG. 9C, a process of (2, A, −a) is further executed. That is, the leaf entry a is deleted from the domination of the container entry A. Thus, a directory structure as shown in FIG. 9D is obtained. In the state of FIG. 9D, a process of (2, A, −B) is further executed.

That is, the container entry B is deleted from the domination of the container entry A. Thus, a directory structure as shown in FIG. 9E is obtained.

In the state of FIG. 9E, since the layer image of the container entry has been changed from the state of FIG. 9D, the schema version Sv is updated to a schema version Sv=3. Therefore, in the state of FIG. 9E, a process to add the container entry C under domination of the container entry A can be described as (3, A, +C). By executing this process, a directory structure as shown in FIG. 9F is obtained.

In the example of FIGS. 9A to 9F, each of (1, A, +B), (2, A, +a), (2, A, −a), (2, A, −B), and (3, A, +C) is set to the differential updating information at each stage.

Figure 10A:
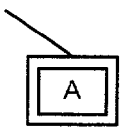
FIGS. 10A to 10D are schematic diagrams for explaining differential updating information of the directory structure.
Figure 10B:
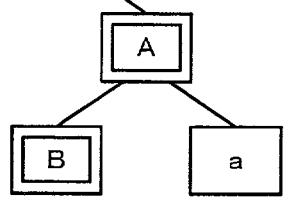

FIGS. 10A to 10D show another example of changing the directory structure. Although one process is executed at a time in the example shown in FIGS. 9A to 9F mentioned above, every two processes are collectively performed in FIGS. 10A to 10D. FIG. 10A shows a state where only the container entry A exists under domination of a root entry (not shown). This state is assumed to be the schema version Sv=1. In the state of FIG. 10A, processes of (1, A, +B) and (1, A, +a) are sequentially executed. That is, the container entry B and leaf entry a are added under domination of the container entry A. Thus, a directory structure as shown in FIG. 10B is obtained. A layer image of container entry changes and the schema version is set to (Sv=2).

In the state of FIG. 10B, processes of (2, A, −a) and (2, B, +b) are further sequentially executed. That is, the leaf entry a is deleted from the domination of the container entry A. After that, a leaf entry b is added under domination of the container entry B. Thus, a directory structure as shown in FIG. 10C is obtained.

Figure 10C:
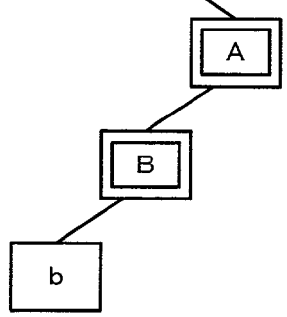
Figure 10D:
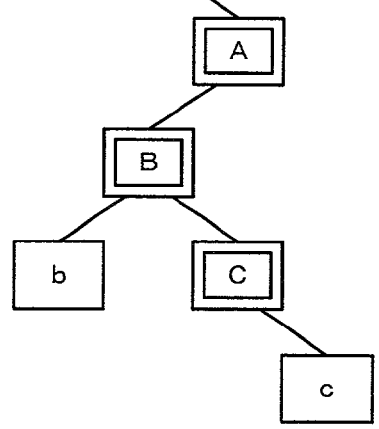

In the state of FIG. 10C, processes of (2, B, +C) and (2, C, +c) are further executed. That is, a container entry C is added under domination of the container entry B and, thereafter, a leaf entry c is added under domination of the added container entry C. In this process, since the entry is further added to the added container entry, the processes cannot be exchanged. After completion of the processes, a directory structure as shown in FIG. 10D is obtained and a layer image of the container entry is changed, so that the schema version Sv is updated to the schema version Sv=3.

In the example of FIGS. 10A to 10D, each of (1, A, +B), (1, A, +a), (2, A, −a), (2, B, +b), (2, B, +C), and (2, C, +c) is set to differential updating information at each stage. As mentioned above, when a plurality of processes are collectively executed as an updating process of one directory structure, it is necessary to consider the processing order.

The differential updating information of the directory structure is not limited to the foregoing example but can be modified to various forms in accordance with the system to which the invention is applied.

With respect to the leaf entry, besides the deletion from the domination of the container entry or the addition to the domination of the container entry, there is a case where only the correction of the contents is performed. When only the correction of the contents is performed, no change occurs in the directory structure. In this case, for example, the differential updating information is constructed by the leaf entry name and a train of the attribute name and attribute value of the corrected attribute in the relevant leaf entry. For example, the differential updating information is described as follows.

```
{
    LeafEntryName,
    Set of { AttributeName, AttributeValue }
}
```

In the system to which the invention is applied, as mentioned above, the differential updating information is unidirectionally transmitted from the transmission side 1 to the reception side 3 through the broadcast network 2. A plurality of reception sides 3 exist for one transmission side 1 and operating states of the plurality of reception sides 3 are also different. Therefore, the directory information managed on the transmission side 1 and the directory information managed on the reception side 3 need to be synchronized.

A method of synchronously managing the directory structure by synchronizing the directory information stored in the transmission side server 11 on the transmission side 1 with the directory information stored in the reception side server 16 on the reception side 3 will now be described hereinbelow.

First, the sync managing method of the container entry will be described with reference to a flowchart of FIG. 11. First, in step S1, the construction of the container layer of the directory structure managed by the transmission side server 11 is changed by the transmission side client 10. For example, the process for adding a new container entry or leaf entry under domination of the container entry or the process for deleting the container entry or leaf entry under domination of the container entry is executed.

In next step S2, the change performed to the transmission side server 11 is detected by the transmission side replicator 12 and container structure updating information Msg.1 due to the change in container layer construction is formed on the basis of a detection result. The formed container structure updating information Msg.1 is broadcasted to the broadcast network 2. The broadcast of the container structure updating information Msg.1 is repetitively performed by cyclically transmitting the same contents a predetermined number of times.

The broadcasted container structure updating information Msg.1 is received by the reception side replicator 17 in step S3. The reception side replicator 17 changes the container layer construction which is managed in the directory information stored in the reception side server 16 on the basis of the received container structure updating information Msg.1. Thus, the synchronization of the structure of the container layer of the directory information is obtained between the transmission side 1 and the reception side 3.

A format of the container structure updating information Msg.1 is defined, for example, as follows.

```
Container Structure Update Message {
    MessageID,
    differential updating information
}
```

"MessageID" (message ID) is identification information of this message (container structure updating information Msg.1) and, for example, an integer which is increased one by one each time this message is formed. The "differential updating information" is differential updating information of the foregoing directory structure due to the change in container layer construction.

Figure 12:
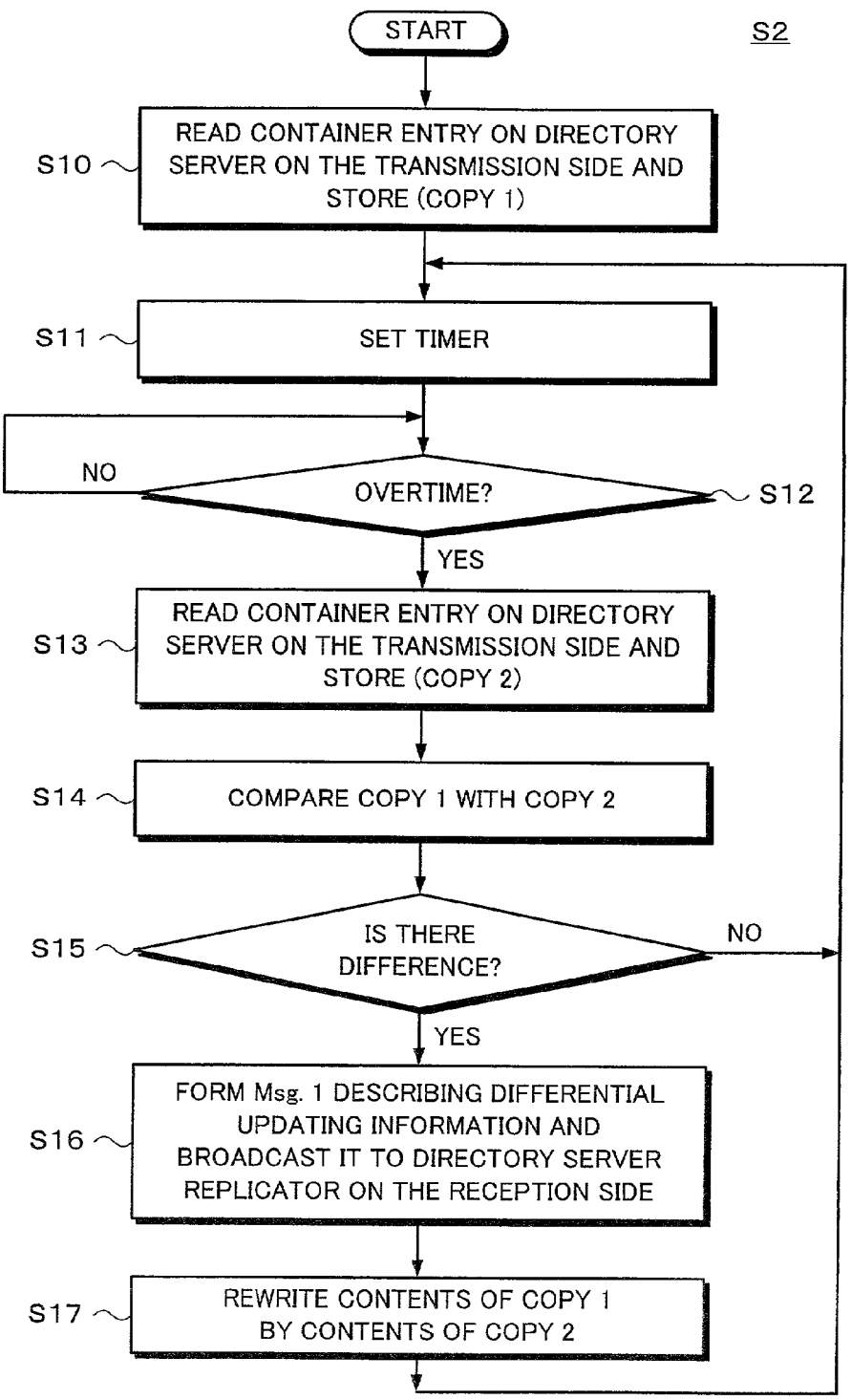
FIG. 12 is a flowchart for explaining the sync managing method of the container entries in more detail.

The process in step S2 in the flowchart of FIG. 11 will be described in more detail with reference to a flowchart of FIG. 12. All of the processes by the flowchart of FIG. 12 are executed on the transmission side replicator 12. First, in step S10, all of the information of the layer construction of the container entry on the transmission side server 11 is read. The read information of the layer construction of the container entry is stored as a copy 1 into a recording or memory medium such as memory or hard disk which the transmission side replicator 12 has.

When the copy 1 is stored, a timer is set into a predetermined time and activated in next step S11. In step S12, whether the predetermined time set in the timer has expired or not is discriminated. If it is determined that the predetermined time has expired, a processing routine advances to step S13. In step S13, all of the information of the layer construction of the container entry on the transmission side server 11 is again read. The read layer structure of the container entry is stored as a copy 2 into a recording or memory medium such as memory or hard disk which the transmission side replicator 12 has.

In next step S14, the copy 1 stred in step S10 is compared with the copy 2 stored in step S13. If there is no difference between them as a result of the comparison (step S15), the processing routine is returned to step S11, the timer is again set, and the copy 2 is stored.

If it is decided in step S14 that there is a difference between the copy 1 and the copy 2, the processing routine advances to step S16. In step S16, differential updating information is formed on the basis of the difference between the copy 1 and the copy 2. The container structure updating information Msg.1 in which the differential updating information has been described is formed. The formed container structure updating information Msg.1 is transmitted to the broadcast network 2 and broadcasted. The broadcasted container structure updating information Msg.1 is received by the reception side replicator 17.

When the container structure updating information Msg.1 is broadcasted in step S16, the contents of the copy 1 are replaced with the contents of the copy 2 in next step S17. The processing routine is returned to step S11.

Figure 13:
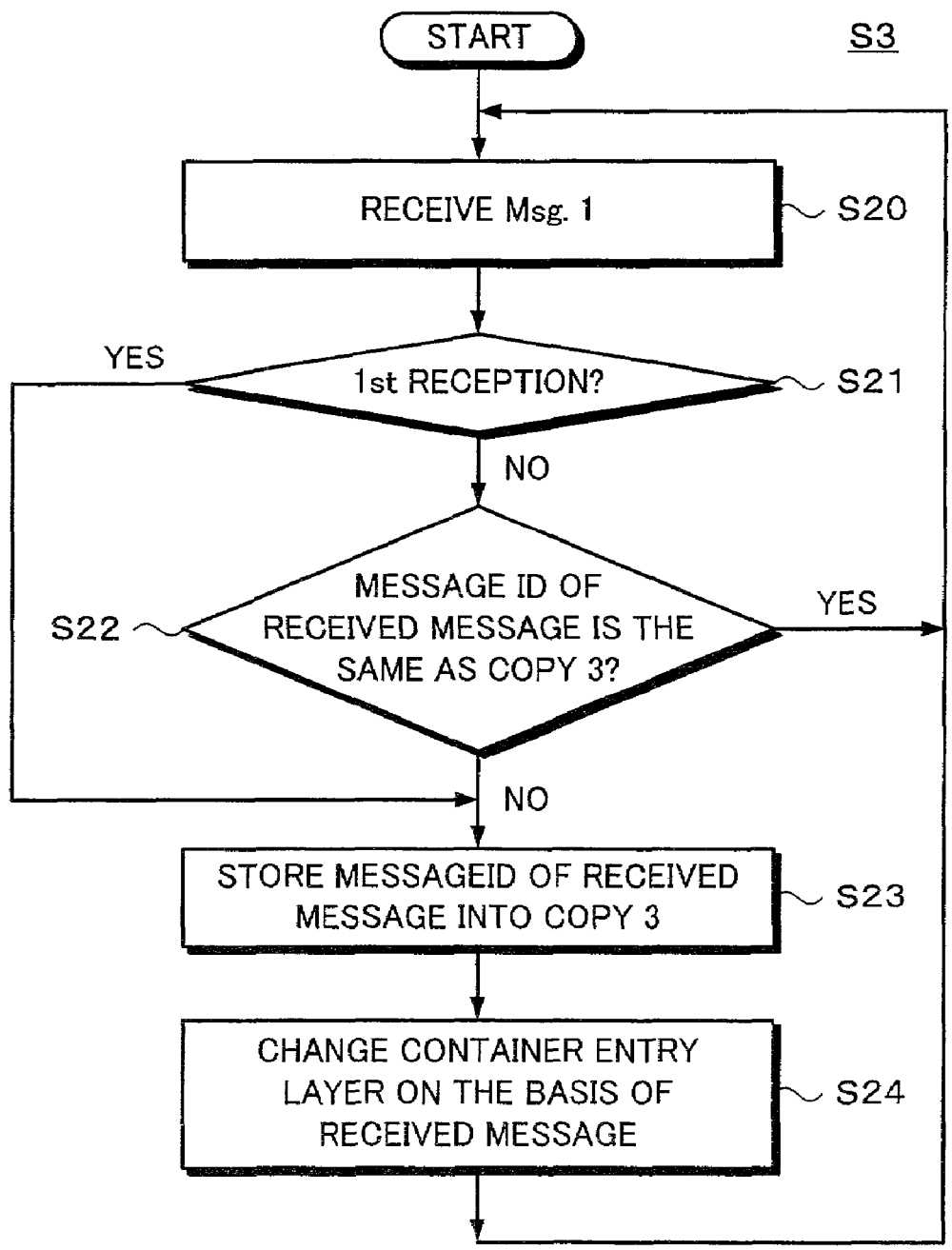
FIG. 13 is a flowchart for explaining the sync managing method of the container entries in more detail.

The process in step S3 in the flowchart of FIG. 11 will be described in more detail with reference to a flowchart of FIG. 13. All of the processes according to the flowchart of FIG. 13 are executed on the reception side replicator 17. In first step S20, the broadcasted container structure updating information Msg.1 transmitted by the transmission side replicator 12 through the broadcast network 2 is received by the reception side replicator 17.

In step S21, whether the reception in step S20 is the first reception of the container structure updating information Msg.1 or not is discriminated. If it is determined that the reception is the first reception, a processing routine advances to step S23. A message ID of the received container structure updating information Msg.1 is stored as a copy 3 into the recording or memory medium such as memory or hard disk which the reception side replicator 17 has.

In next step S24, the directory information managed by the reception side server 16 is updated on the basis of the contents of the received container structure updating information Msg.1, that is, on the basis of the differential updating information described in the container structure updating information Msg.1, and the construction of the container layer shown by the directory information is changed. After completion of the process in step S24, the processing routine is returned to step S20.

In step S21, if it is determined that the reception of the container structure updating information Msg.1 in step S20 is not the first reception, step S22 follows. In step S22, whether the message ID described in the received container structure updating information Msg.1 is the same as the message ID stored as a copy 3 in the process in step S23 at the time of the previous reception or not is discriminated. If they coincide, the processing routine is returned to step S20.

If it is determined that both message IDs do not coincide in step S22, step S23 follows. In step S23, as mentioned above, the message ID is stored as a copy 3 into the memory medium. In this case, the message ID which has previously been received and stored is, for example, overwritten by the newly received message ID. In next step S24, the contents in the container entry layer on the reception side server 16 are changed on the basis of the received container structure updating information Msg.1.

A sync managing method of the leaf entry will now be described with reference to a flowchart of FIG. 14. First, in step S30, the leaf entry under domination of a certain container entry of the directory structure managed by the transmission side server 11 is changed by the transmission side client 10. For example, a process for adding the new leaf entry under domination of a certain container entry or a process for deleting or correcting the leaf entry under domination of a certain container entry is executed.

In next step S31, the change performed to the leaf entry under domination of a certain container entry of the transmission side server 11 is detected by the transmission side replicator 12. On the basis of a detection result, leaf updating information Msg.x1 due to the change in leaf entry under domination of a certain container entry is formed. The formed leaf updating information Msg.x1 is cyclically broadcasted to a plurality of reception side replicators 17 through the broadcast network 2.

In step S32, the broadcasted leaf updating information Msg.x1 is received by the reception side replicator 17. The reception side replicator 17 changes the corresponding leaf entry which is managed in the directory information stored in the reception side server 16 on the basis of the received leaf updating information Msg.x1. Thus, the synchronization of the leaf entry of the directory information is obtained between the transmission side 1 and the reception side 3.

For example, a format of the leaf updating information Msg.x1 is defined as follows.

```
Leaf Entry Update Message {
    MessageID,
    differential updating information
}
```

"MessageID" (message ID) is identification information of this message (leaf updating information Msg.x1) and, for example, an integer which is increased one by one each time this message is formed. The "differential updating information" is differential updating information of the directory structure mentioned above.

The process in step S31 in the flowchart of FIG. 14 will be described further in detail with reference to a flowchart of FIG. 15. All of the processes according to the flowchart of FIG. 15 are executed on the transmission side replicator 12. First, in step S40, names of all of the leaf entries under domination of a certain container entry on the transmission side server 11 are read. The read leaf entry names are stored as a copy 4 into the recording or memory medium such as memory or hard disk which the transmission side replicator 12 has.

When the copy 4 is stored, a timer is set to a predetermined time and activated in next step S41. Whether the predetermined time set into the timer has expired or not is discriminated in step S42. If it is determined that the predetermined time has expired, a processing routine advances to step S43. In step S43, names of all of the leaf entries under domination of a certain container entry on the transmission side server 11 are again read. The read leaf entry names are stored as a copy 5 into the recording or memory medium such as memory or hard disk which the transmission side replicator 12 has.

In next step S44, the copy 4 stored in step S40 is compared with the copy 5 stored in step S43. If there is no difference between them as a result of the comparison (step S45), the processing routine is returned to step S41. The timer is again set and the copy 5 is stored.

If it is determined that there is the difference between the copy 4 and the copy 5 in step S44, step S46 follows. In step S46, differential updating information is formed on the basis of the difference between the copy 4 and the copy 5. Leaf updating information Msg.x1 in which the differential updating information has been described is formed. The formed leaf updating information Msg.x1 is transmitted to the broadcast network 2 and broadcasted. The broadcasted leaf updating information Msg.x1 is received by a plurality of reception side replicators 17.

When the leaf updating information Msg.x1 is broadcasted in step S46, the contents of the copy 4 are rewritten by the contents of the copy 5 in next step S47. The processing routine is returned to step S41.

The processes in the flowchart of FIG. 15 mentioned above are executed by the transmission side replicator 12 to all of the container entries on the directory structure which is managed by the transmission side server 11.

Figure 16:
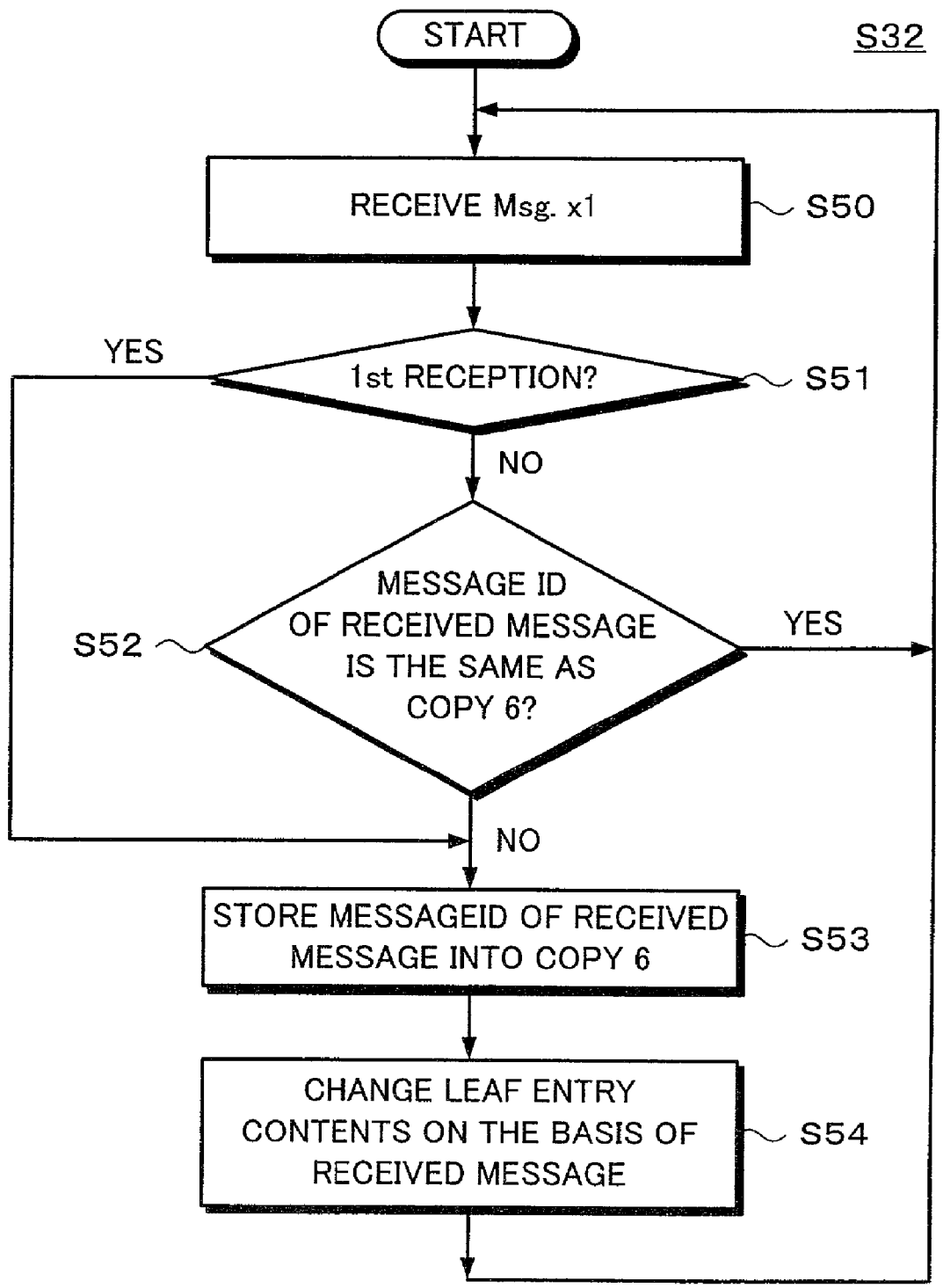
FIG. 16 is a flowchart for explaining the sync managing method of the leaf entries in more detail.

The process in step S32 in the flowchart of FIG. 14 will be described in more detail with reference to a flowchart of FIG. 16. All of the processes in the flowchart of FIG. 16 are executed on the reception side replicator 17. In first step S50, the leaf updating information Msg.x1 broadcasted by the transmission side replicator 12 through the broadcast network 2 is received by the reception side replicator 17.

In step S51, whether the reception in step S50 is the first reception of the leaf updating information Msg.x1 or not is discriminated. If it is determined that the reception is the first reception, step S53 follows. The message ID of the received leaf updating information Msg.x1 is stored as a copy 6 into the recording or memory medium such as memory or hard disk which the reception side replicator 17 has.

In next step S54, the contents of the corresponding leaf entry in the directory information managed by the reception side server 16 are changed on the basis of the contents of the received leaf updating information Msg.x1, that is, on the basis of the differential updating information described in the leaf updating information Msg.x1. After completion of the process in step S54, the processing routine is returned to step S50.

If it is determined in step S51 that the reception of the leaf updating information Msg.x1 in step S50 is not the first reception, step S52 follows. In step S52, whether the message ID described in the received leaf updating information Msg.x1 and the message ID stored as a copy 6 in the process in step S53 at the time of the previous reception are the same or not is discriminated. If they are the same, the processing routine is returned to step S50.

If the message IDs of them are different in step S52, the processing routine advances to step S53. In step S53, the message ID is stored as a copy 6 into the memory medium as mentioned above. In this case, the message ID which has previously been received and stored is, for example, overwritten by the newly received message ID. In next step S54, the contents of the corresponding leaf entry on the reception side server 16 are changed on the basis of the received leaf updating information Msg.x1.

Figure 14:
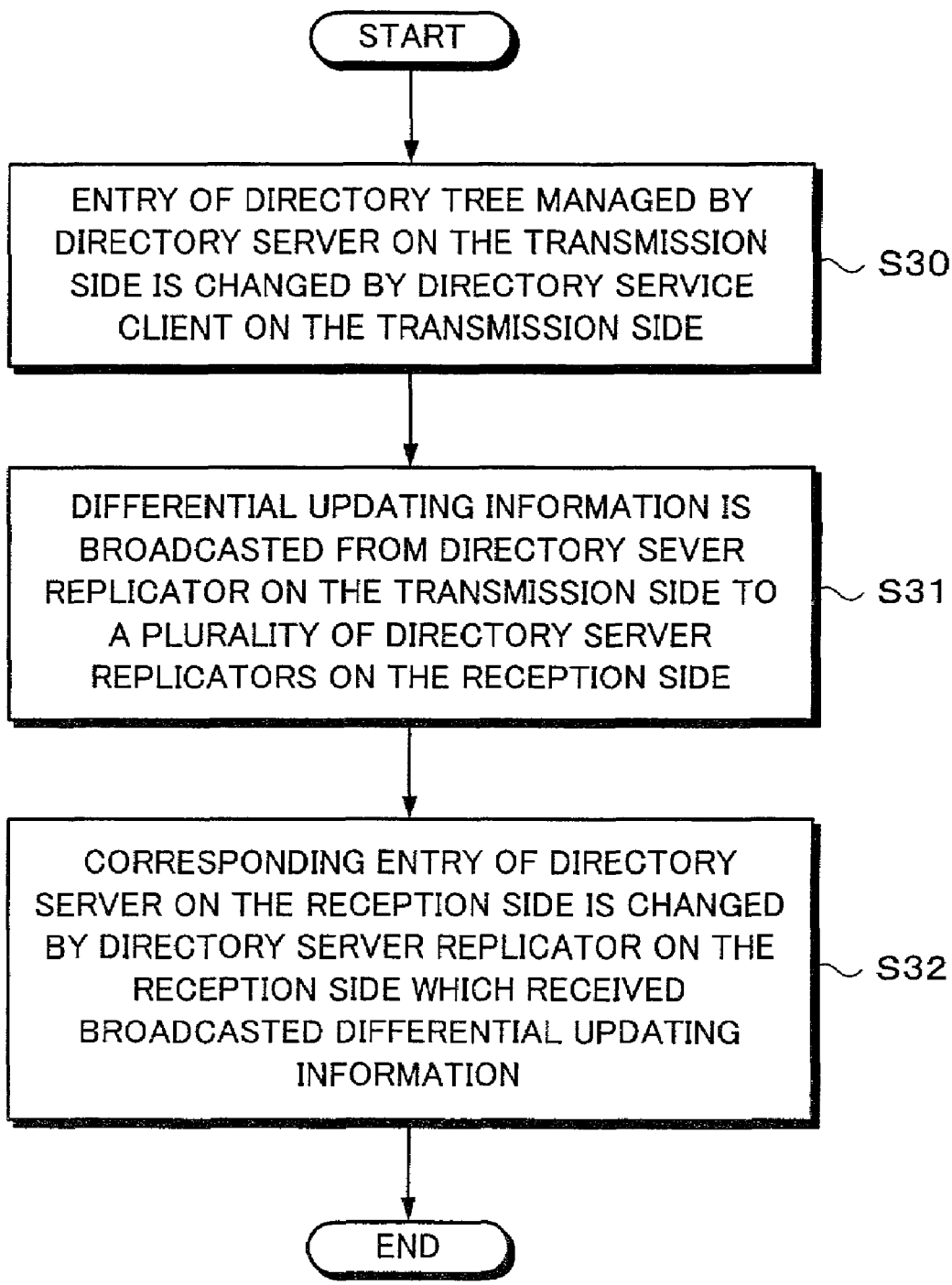
FIG. 14 is a flowchart for explaining a sync managing method of the leaf entries.
Figure 15:
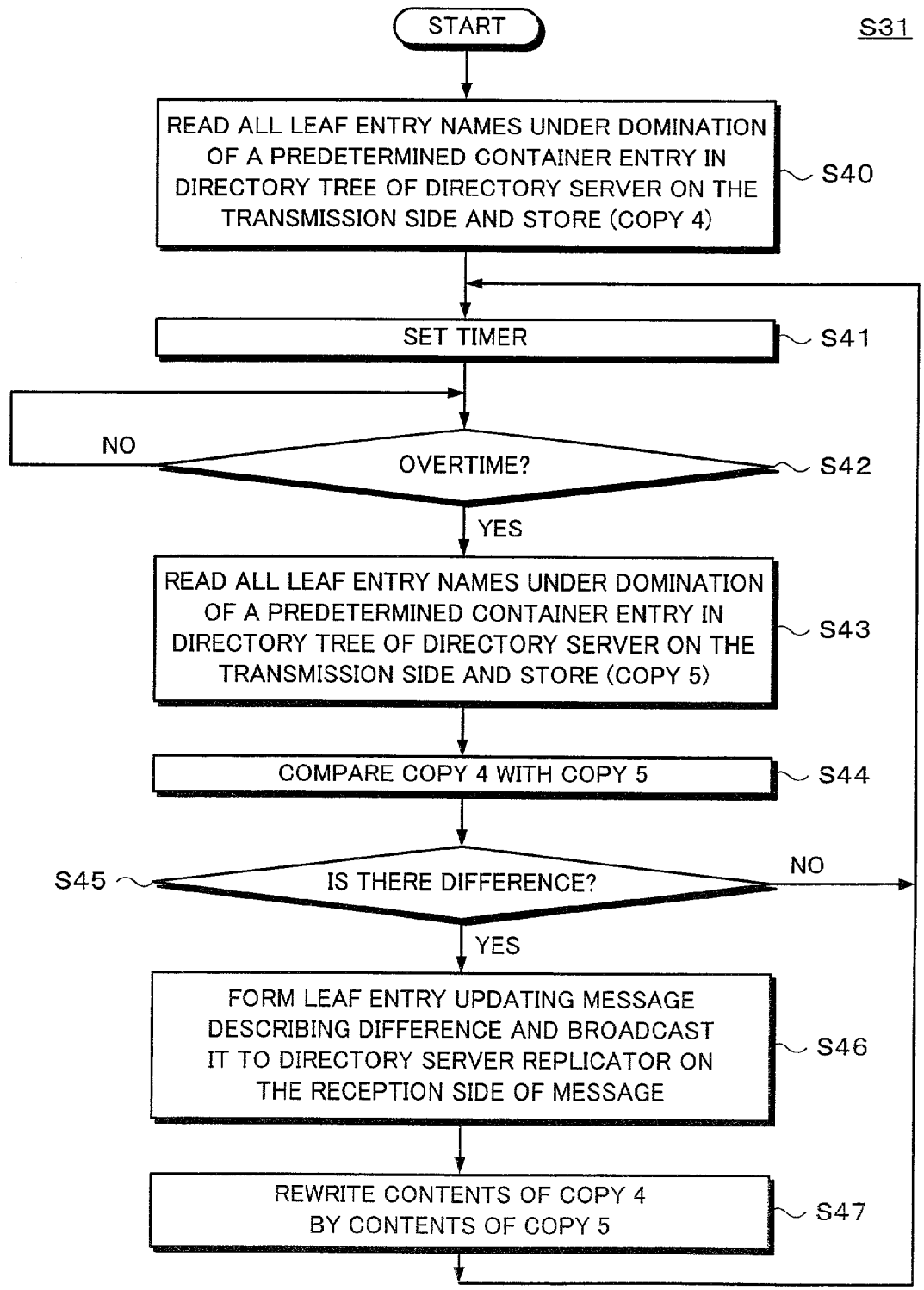
FIG. 15 is a flowchart for explaining the sync managing method of the leaf entries in more detail.

As mentioned above, the broadcast of the leaf updating information Msg.x1 in step S31 in the flowchart of FIG. 14 is executed with respect to each of all container entries in the directory structure which is managed on the transmission side 1 and it is presumed that an amount of leaf updating information Msg.x1 which is broadcasted will be very large. Therefore, as already mentioned as a problem in the related art, if all of the leaf updating information Msg.x1 is received and the processes according to the flowchart of FIG. 16 are executed on the reception side 3, it results in a large burden. On the reception side 3, thus, it is necessary that only the leaf updating information Msg.x1 for the leaf entry under domination of the container entry which is necessary, that is, which is often collated is efficiently filter-processed from a number of broadcasted leaf updating information Msg.x1.

For example, there is presumed a case where the reception side replicator 17 is installed in an environment such that it is connected to a television receiver or the like in a home, that is, like a set top box (STB) in which a processing ability and a memory capacity are limited, namely, there is a limitation in computer resources. In this case, there is a limitation in the operation for obtaining the leaf updating information Msg.x1 which is broadcasted. Therefore, it is necessary to selectively fetch the received leaf updating information Msg.x1 into the apparatus and reduce storage costs and message processing costs. That is, in the reception side replicator 17, it is necessary to limit the costs which are required for unnecessary storage and processes. Particularly, in association with the spread of the directory service and the increase in directory structure as a target to be managed on the transmission side server 11, the selective fetching of the leaf updating information Msg.x1 mentioned above becomes a more important item.

A method of performing the filtering process to the leaf updating information Msg.x1 will now be described hereinbelow. A method of efficiently performing the filtering process according to the spirit of the present invention will be further explained. The transmission side replicator 12 adds a filtering mask for performing the filtering process in the reception side replicator 17 to the leaf updating information Msg.x1 which is broadcasted. A mask schema structure for interpreting the filtering mask, a method of notifying the reception side replicator 17 of the mask schema structure from the transmission side replicator 12, and the like will be described hereinlater.

A structure of the message (Msg.x1') in which the filtering mask has been added to the leaf updating information Msg.x1 is defined as follows. All of the leaf updating information Msg.x1 mentioned above is replaced with the leaf updating information Msg.x1'. That is, the leaf updating information Msg.x1' is defined as follows.

```
Leaf Entry Update Message {
    MessageID,
    FilteringMask,
    differential updating information
}
```

In a manner similar to the case of the leaf updating information Msg.x1 mentioned above, "MessageID" (message ID) is identification information of this message (leaf updating information Msg.x1') and, for example, an integer which is increased one by one each time this message is formed. The "differential updating information" is information for a procedure for the addition, deletion, and attribute change of the leaf entry under domination of the container entries which are specified by the filtering mask described in the differential updating information.

A structure of "FilteringMask" (filtering mask) is defined as follows. That is, the filtering mask is defined as follows.

```
FilteringMask {
    MaskSchema Version,
    Mask Value
}
```

"MaskSchema Version" (mask schema version) corresponds to, for example, the message ID in the container structure updating information Msg.1 mentioned above and is, for example, a value which is increased one by one each time the filtering mask is formed. "Mask Value" (mask value) is a value of the mask which is expressed, for example, on a bit train or byte unit basis.

A structure of the mask value is specified by a mask schema (which will be explained hereinlater) that is made to correspond by the mask schema version. The reception side replicator 17 is notified of the mask schema from the transmission side replicator 12 by another message, which will be explained hereinlater.

An assigning method of the mask value will be explained. In the embodiment, each of the container entries under domination of a certain container entry is identified by a bit train consisting of a predetermined number of bits. In the reception side replicator 17, the filtering process is executed with reference to the mask value described in the received leaf updating information Msg.x1' and the necessary leaf updating information Msg.x1' can be selectively extracted.

Figure 17A:
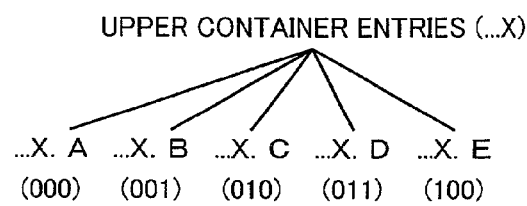
FIGS. 17A to 17D are schematic diagrams for explaining a bit arrangement structure of mask values of filtering masks.
Figure 17B:
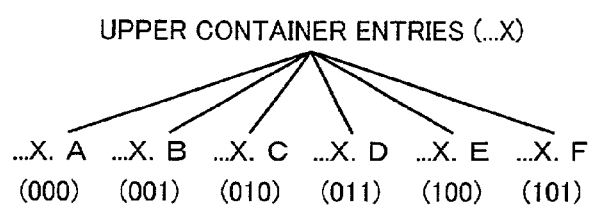

A bit array structure of the mask value of the filtering mask is determined in correspondence to the layer structure of the container entry. For example, as shown in FIG. 17A, mask values (000), (001), (010), (011), and (100) each consisting of 3 bits are assigned to entries X.A, X.B, X.C, X.D, and X.E under domination of the upper container entry X so as to identify them in accordance with the describing method of the entry names explained in conjunction with FIG. 3, respectively. [...] denotes the existence of a higher container entry.

Figure 18:
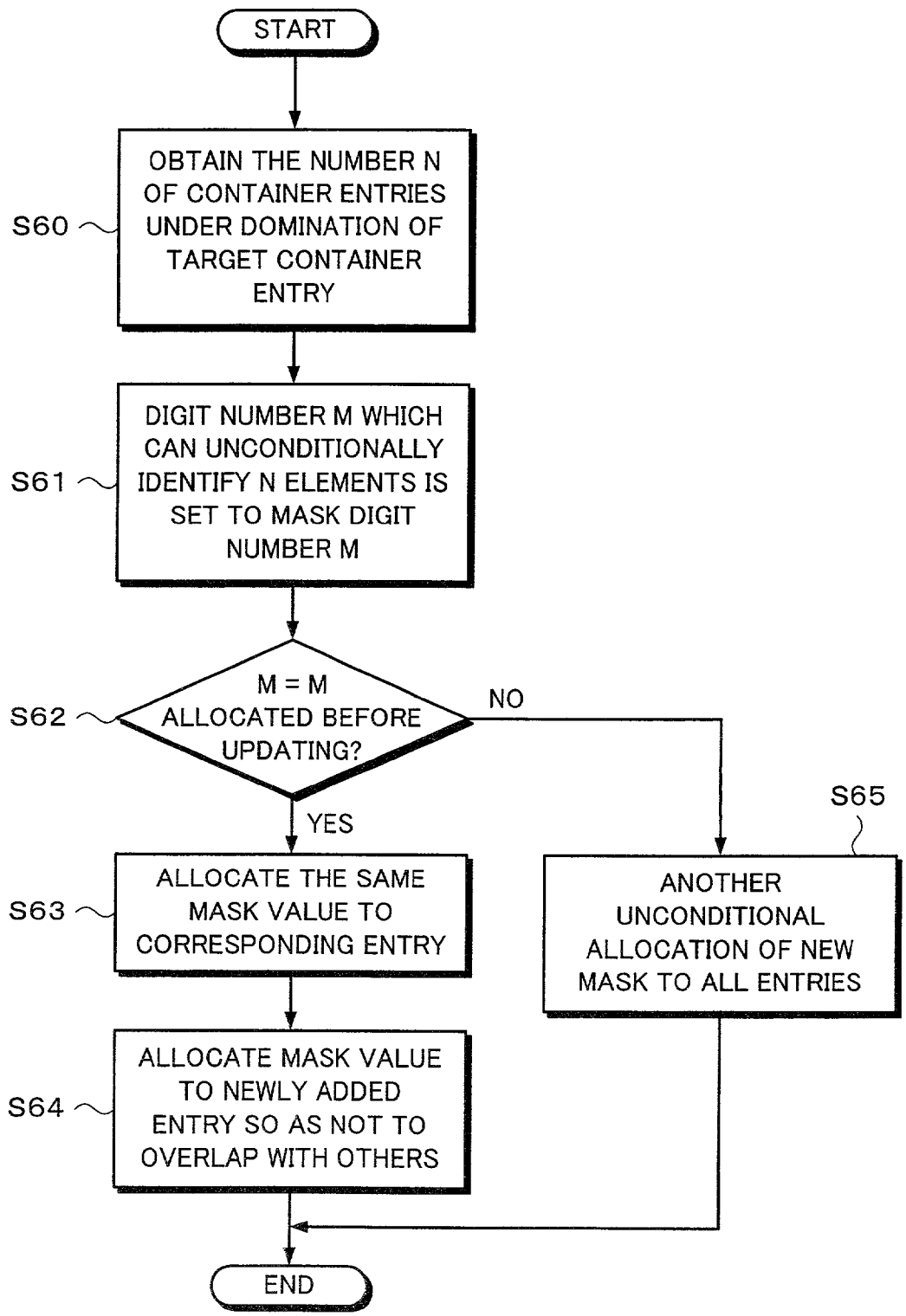
FIG. 18 is a flowchart for an assigning process of the mask values according to an increase or decrease of the container entries in the case where entries are added or deleted.

When the addition or deletion of entries is performed to the container entries to which the mask values have been assigned and which exist under domination of the container entry X, processes are executed in accordance with a flowchart of FIG. 18. The mask values are assigned in accordance with an increase or decrease of the container entries. The container layer before execution of the addition or deletion of the container entries is referred to as a pre-updating container layer hereinbelow. It is assumed that digit number M' of the mask of the pre-updating container layer has been stored in, for example, a memory of the transmission side replicator 12.

First, in step S60, the number N of container entries under domination of the target container entry is obtained by the transmission side replicator 12. The number N of container entries can be obtained by referring to the list of the subordinate container entries in the container entry. In next step S61, the number M of bits by which N elements can be unconditionally identified is selected and the digit number of the mask is set to M. For example, in the example of FIG. 17 mentioned above, since the container entry X has five subordinate container entries, the bit number [3] by which the five container entries can be unconditionally identified is set to the digit number of the mask.

Subsequently, in step S62, whether the number M of bits assigned in step S61 coincides with the mask digit number M' assigned to the corresponding pre-updating container layer or not is discriminated. If the mask digit number M and the mask digit number M' are the same, a processing routine advances to step S63.

In step S63, the same mask value is assigned to the entries corresponding to the container entries of the pre-updating container layer among the container entries of a post-updating container layer. Further, in next step S64, if a container entry in which the container entries corresponding to the pre-updating container layer do not exist exists in the post-updating container layer due to a reason such that a container entry was newly added to the post-updating container layer or the like, a mask value such as not to overlap with the mask values of the other container entries of the same container layer is assigned to such a container entry.

If it is decided in step S62 that the mask digit numbers M and M' are different, the processing routine advances to step S65. The mask value is unconditionally assigned to each of all container entries of the relevant container layer.

For example, it is assumed that a container entry "... X.F" is newly added to the state of FIG. 17A mentioned above and a container layer as shown in FIG. 17B is obtained. The number N of container entries under domination of the container entry "... X" is equal to 6 and 3 bits are necessary to express unconditionally. The mask digit number M of the container layer under domination of the updated container entry "... X" is equal to (M=3). Since the mask digit number M' of the pre-updating container layer is equal to (M'=3), the mask digit number M' and the mask digit number M are equal. Therefore, the mask values of the corresponding entries of the pre-updating container layer are assigned to the container entries "... X.A", "... X.B", "... X.C", "... X.D", and "... X.E" shown in FIG. 17B, respectively (step S63). On the other hand, the mask value (101) is assigned to the newly added container entry "... X.F" so as not to overlap with the other container entries of the same container layer (step S64).

Figure 17C:
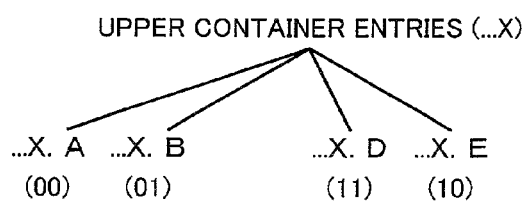

For example, it is also assumed that the container entry "... X.C" is deleted from the state of FIG. 17A and a container layer as shown in FIG. 17C is obtained. In this case, the number N of container entries under domination of the container entry "... X" is equal to 4 and each container entry can be identified by the mask digit number M of 2 bits, so that the mask digit number M of the post-updating container layer is equal to (M=2). The mask digit number M' of the pre-updating container layer is equal to (M'=3) and the mask digit number before updating and that after the updating are different. Therefore, the mask value is newly assigned to all of the entries of the relevant layer by the mask digit number M=2 by a process in step S65.

Figure 17D:
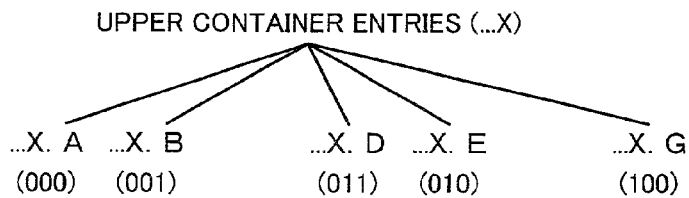

It is assumed that a container entry "... X.G" is further newly added to the state of FIG. 17C and a state of FIG. 17D is obtained. In this case, the number N of container entries under domination of the container entry "... X" is equal to 5 and it is necessary to set the mask digit number M to (M=3) in order to mutually identify the container entries. Since the mask digit number M differs from the mask digit number M'=2 before the updating, the mask values are newly assigned to all of the container entries under domination of the container entry "... X" by the process in step S65.

Bit assignment of the mask values is sequentially and serially performed from the upper side of the directory structure in order of the container layer. In the embodiment, the mask digit number differs depending on the number of entries existing in the same layer as mentioned above. The number of entries in the container layer changes due to the deletion, addition, or the like of the entry and the mask digit number changes in association with it. Therefore, an information mechanism for discriminating to which container entry (or container layer) which bit in the bit train showing the mask value corresponds and interpreting the mask value is necessary.

In the embodiment, the following mask schema (Maskschema) is defined as an information mechanism for interpreting the mask value. The mask schema is defined as follows.

```
MaskSchema {
    MaskSchema Version,
    TotalMaskLength,
    Set of ContainerEntryMaskSchema
}
```

"MaskSchema Version" (mask schema version) corresponds to, for example, the message ID in the container structure updating information Msg.1 mentioned above and, for example, is a value which is increased by "1" each time the corresponding filtering mask is formed. "TotalMaskLength" (total mask length) shows a bit length of the whole mask value corresponding to the whole container layer. That is, the total mask length corresponds to the number of bits necessary for expressing all of the layers in the directory structure. "Set of ContainerEntryMaskSchema" (set of container entry mask schemas) indicates an array of "ContainerEntryMaskSchema" (container entry mask schemas), which will be explained hereinlater.

The foregoing container entry mask schema specifies the filtering mask corresponding to a certain container entry. That is, the container entry mask schema is defined as follows.

```
ContainerEntryMaskSchema {
    ContainerEntryName,
    OffsetLength,
    MaskLength,
    AssigndMaskValue
}
```

"ContainerEntryName" (container entry name) is a character train showing the entry name of the target container entry.

"OffsetLength" (offset length) is an offset value of the filtering mask corresponding to this container entry from the first bit of all of the mask values. "MaskLength" (mask length) indicates the digit number (bit length) of the mask value. "AssignedMaskValue" (assigned mask value) indicates a mask value assigned to the target container entry and is expressed by the bit train.

Figure 19A:
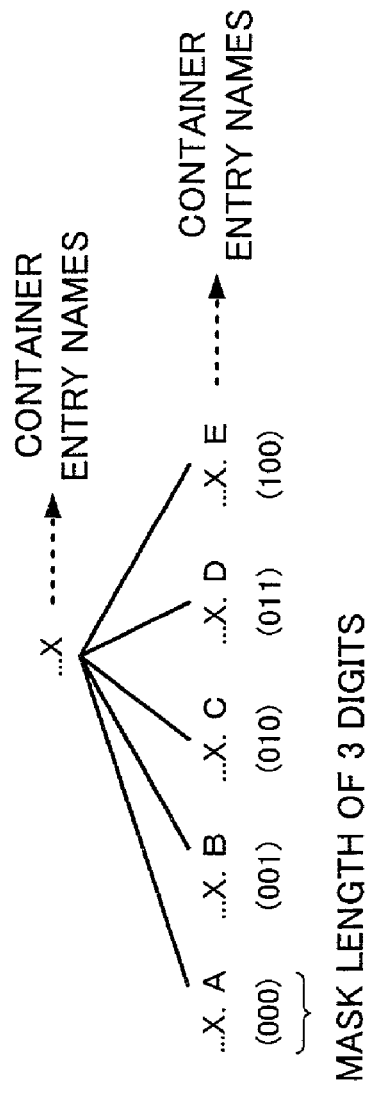
FIGS. 19A and 19B are schematic diagrams for explaining the encoding of a container entry mask schema.

The encoding of the container entry mask schema will be described with reference to FIGS. 19A and 19B. FIG. 19A is a diagram corresponding to FIG. 17A. Five container entries of the container entry names ". . . X.A", ". . . X. B", ". . . X. C", ". . . X.D", and ". . . X.E" exist under domination of the upper container entry ". . . X", and the mask value is assigned by the mask length of three digits, respectively. For simplicity of explanation, it is now assumed that those five container entries do not have other subordinate entries.

Figure 19B:
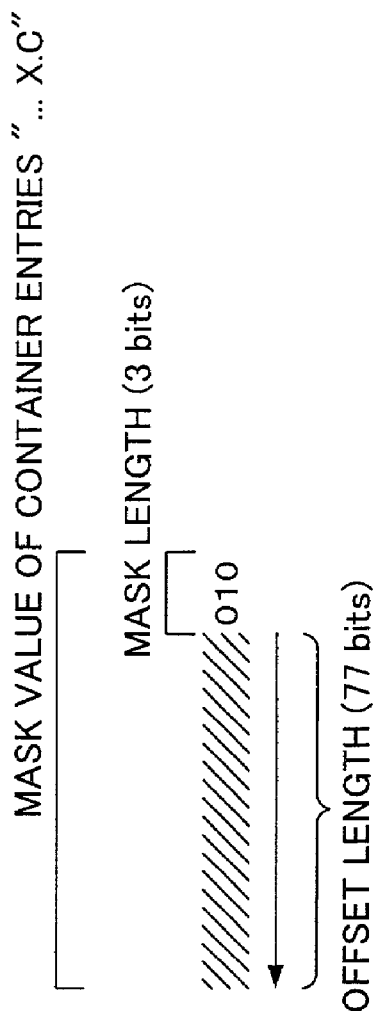

FIG. 19B shows an example of the mask value of the container entry ". . . X.C". In this example, since the offset length is equal to 77 bits, it will be understood that the assigned mask value which was assigned to the container entry ". . . X.C" by the mask length of 3 bits corresponds to 3 bits which start from the 78th bit of the mask value of the container entry ". . . X.C". The mask value of 77 bits included in the offset length is the assigned mask value corresponding to the container entry higher than the container entry ". . . X.C".

As mentioned above, the position of the assigned mask value of the target container entry in the mask value is specified and the container entry mask schema is encoded.

A more specific example of the container entry mask schema is shown. The container entry mask schema corresponding to the container entry ". . . X.C" mentioned above is, for example, as follows.

```
ContainerEntryMaskSchema {
    "...X.C",    (ContainerEntryName)
    77,          (OffsetLength)
    3,           (MaskLength)
    010          (AssignedMaskValue)
}
```

The inside of the parentheses ( ) is written for explanation and doesn't need to be actually described.

The container entry mask schema corresponding to the container entry ". . . X.D" shown in FIG. 19A is, for example, as follows.

```
ContainerEntryMaskSchema {
    "...X.D",
    77,
    3,
    011
}
```

For example, assuming that the mask schema version is equal to 498 and the total mask length is equal to 134 bits, the mask schema at this time is as follows.

```
MaskSchema {
    498,         (MaskSchema Version)
    134,         (TotalMaskLength)
    . . .
```

```
    ContainerEntryMaskSchema {
        "...X.C",
        77,
        3,
        010
    }
    ContainerEntryMaskSchema {
        "...X.D",
        77,
        3,
        011
    }
    . . .
}
```

In the above example, although the container entry mask schemas of the container entries ". . . X.C" and ". . . X.D" are described in the mask schema, further another container entry mask schema is described in the portion of [. . . ]. As will be understood in this example, the container entry mask schemas regarding all of the container entries in one directory structure are described in this mask schema.

Although the total mask length is equal to 134 bits in this example, in the container entry mask schemas regarding the container entries ". . . X.C" and ". . . X.D", the offset value is equal to 77 bits and the mask length is equal to 3 bits, so that the total length is equal to 80 bits. This means that the container layers further exist under domination of the container entries ". . . X.C" and ". . . X.D".

In the foregoing mask schema, the encoding of the filtering mask corresponding to the container entry ". . . X.C" is, for example, as follows.

```
FilteringMask {
    498,              (MaskSchema Version)
    . . . . . . . . . . . 010    (Mask Value)
}
```

As for the mask value (Mask Value), all of the portions other than [011] are filled with bits consisting of the assigned mask value of the container entry of the other layer.

Similarly, the encoding of the filtering mask corresponding to the container entry ". . . X.D" is, for example, as follows.

```
FilteringMask {
    498,              (MaskSchema Version)
    . . . . . . . . . . . 011    (Mask Value)
}
```

On the transmission side replicator 12, the transmission side server 11 is monitored, the change in layer structure of the container entry is detected, and the change of the mask schema mentioned above is performed. Therefore, to perform a proper filtering process on the reception side 3, it is necessary that the transmission side replicator 12 notifies the reception side replicator 17 of the changed mask schema together with the notification of the differential updating information based on the change in layer structure.

In the invention, in order to notify the mask schema from the transmission side replicator 12 to the reception side replicator 17, a mask schema structure is added to the structure of the container structure updating information Msg.1 mentioned above. A container structure updating information Msg.1' to which the mask schema structure has been added is defined as follows.

```
Container Structure Update Message {
    MessageID,
    differential updating information,
    MaskSchema
}
```

There is a possibility that the mask schema is changed each time the construction of the container layer is changed. Therefore, the container structure updating information Msg.1' is also formed in accordance with the change in construction of the container layer. "MessageID" (message ID) is an integer which is increased one by one each time the container structure updating information Msg.1' is formed. It is assumed herinbelow that all of the foregoing container structure updating information Msg.1 is replaced with the container structure updating information Msg.1'.

The transmission side replicator 12 forms the leaf updating information Msg.x1' as a message to which the filtering mask which was made to correspond to the container layer in step S46 in the flowchart of FIG. 15 mentioned above has been added, and broadcasts it to the reception side replicator 17. On the reception side 3, prior to performing the filtering process on the reception side replicator 17 by the leaf updating information Msg.x1', it is necessary to spceecify the target portion of the container layer which the reception side client 15 needs.

In the embodiment, in the reception side replicator 17, a target mask list in which the masks for filter-processing the target container layer are set to a list is formed.

Figure 20A:
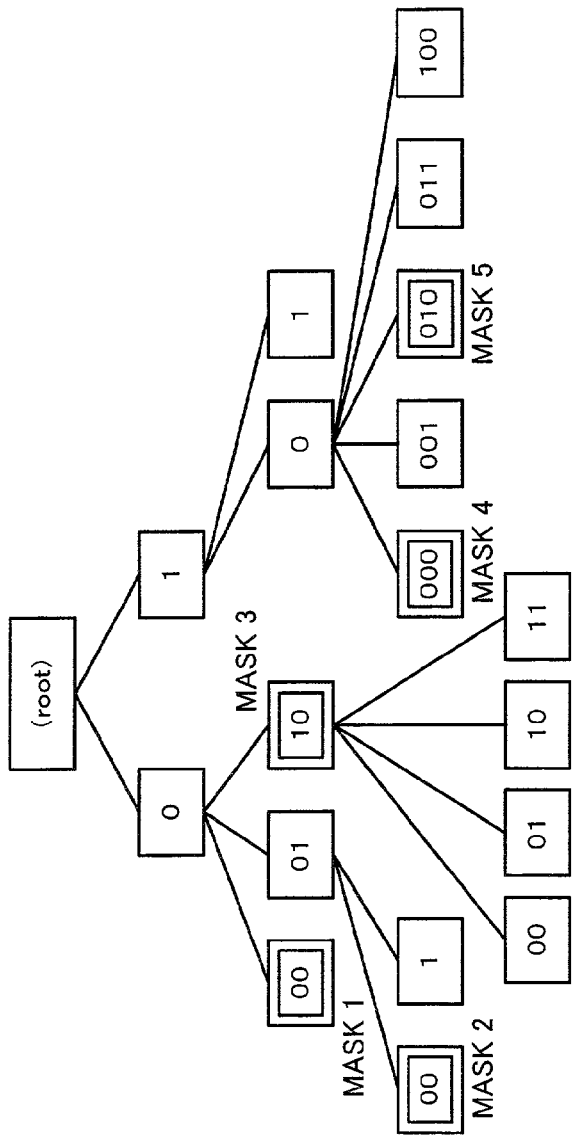
FIGS. 20A and 20B are schematic diagrams for explaining a target mask list.

The target mask list will be described with reference to FIGS. 20A and 20B. First, a directory structure as shown in FIG. 20A is presumed. It is assumed that in the directory layer in FIG. 20A, all of the entries other than the highest root entry are constructed by the container entries. Each rectangle indicates a container entry. A container entry shown by a rectangle of double lines is an entry specified so as to perform the filtering process by the reception side client 15, for example, on the basis of a favor of the user. A number shown in each entry denotes a mask value assigned to each entry.

As shown in FIG. 20A, masks 1 to 5 are assigned to each of the container entries specified by the reception side client 15 so as to perform the filtering process on the basis of the favor of the user. In the directory structure, the mask values of the total mask lengths of the masks 1 to 5 are set as follows by tracing the directory structure from the upper side: that is, the mask 1 is set to [000], the mask 2 is set to [0010], the mask 3 is set to [010], the mask 4 is set to [10000], and the mask 5 is set to [10010], respectively.

Figure 20B:
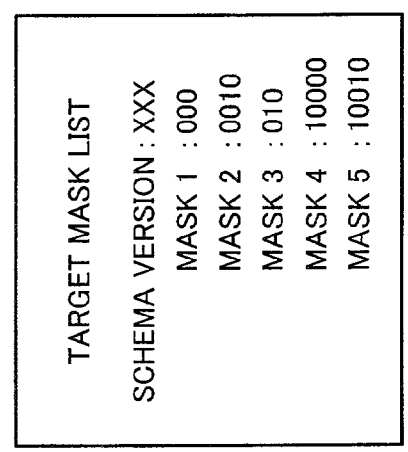

FIG. 20B shows an example of a target mask list in which the masks specified as mentioned above are set to a list. The target mask list comprises: a schema version for specifying the structure of the directory; and the foregoing list of the mask values specified by the reception side client 15 on the basis of the favor of the user. That is, the target mask list is valid only in the directory structure described by the schema version.

Figure 21:
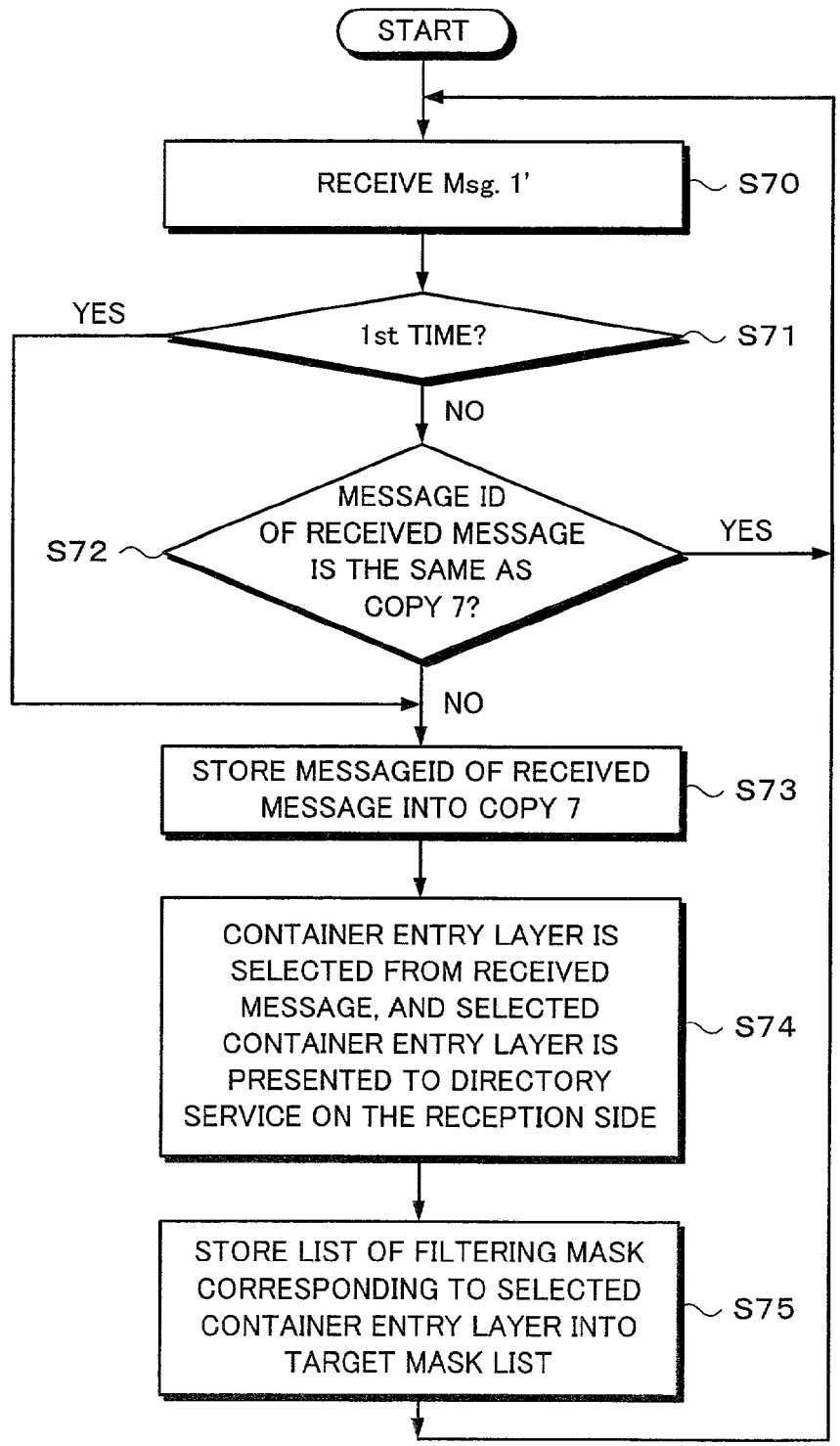
FIG. 21 is a flowchart for a process for making the target mask list.

FIG. 21 is a flowchart for processes for forming the target mask list. This flowchart is executed by the reception side replicator 17. First, in step S70, the container structure updating information Msg.1' is received by the reception side replicator 17. In step S71, whether the reception in step S70 is the first reception of the container structure updating information Msg.1' or not is discriminated. If it is determined that it is the first reception, step S73 follows.

In step S73, the message ID of the received container structure updating information Msg.1' is stored as a copy 7 into the recording or memory medium such as memory or hard disk which the reception side replicator 17 has.

In next step S74, a container layer is formed on the basis of the contents of the received container structure updating information Msg.1'. Information showing the formed container layer is presented to the reception side client 15 from the reception side replicator 17, thereby promoting the selection of the container entries to be specified. For example, the reception side client 15 performs a display based on the supplied information showing the container layer by using predetermined display means. The user selects necessary container entries by a predetermined method on the basis of the display. The information of the selected container entries is sent from the reception side client 15 to the reception side replicator 17.

The specifying method of the container entries is not limited to the method of specifying them by the direct selection of the user. For example, it is also possible to use a method whereby information of the container entries collated by the user is accumulated by the reception side client 15, a tendency of a favor of the user is learned on the basis of the accumulated information, and the container entries which are considered to be necessary are automatically selected. Further, both the direct selection by the user and the automatic selection by the learning can be also used.

When the container entries are selected in step S74 as mentioned above, the filtering masks corresponding to the selected container entry layers are set in step S75. A list of the set filtering masks is stored as a target mask list into, for example, the recording or memory medium such as memory or hard disk which the reception side replicator 17 has.

If it is determined in step S71 that the reception of the container structure updating information Msg.1' is not the first reception, step S72 follows. In step S72, a check is made to see if the message ID of the received container structure updating information Msg.1' coincides with the message ID stored as a copy 7 into the memory medium in step S73 by the reception of the container structure updating information Msg.1' until the previous time.

If it is determined that they are the same, the processing routine is returned to step S70. If it is determined that they are different in step S72, the processing routine advances to step S73. The message ID of the container structure updating information Msg.1' received at this time is stored into the memory medium in place of the previous message ID and the subsequent processes are executed on the basis of the present received container structure updating information Msg.1'.

Figure 22:
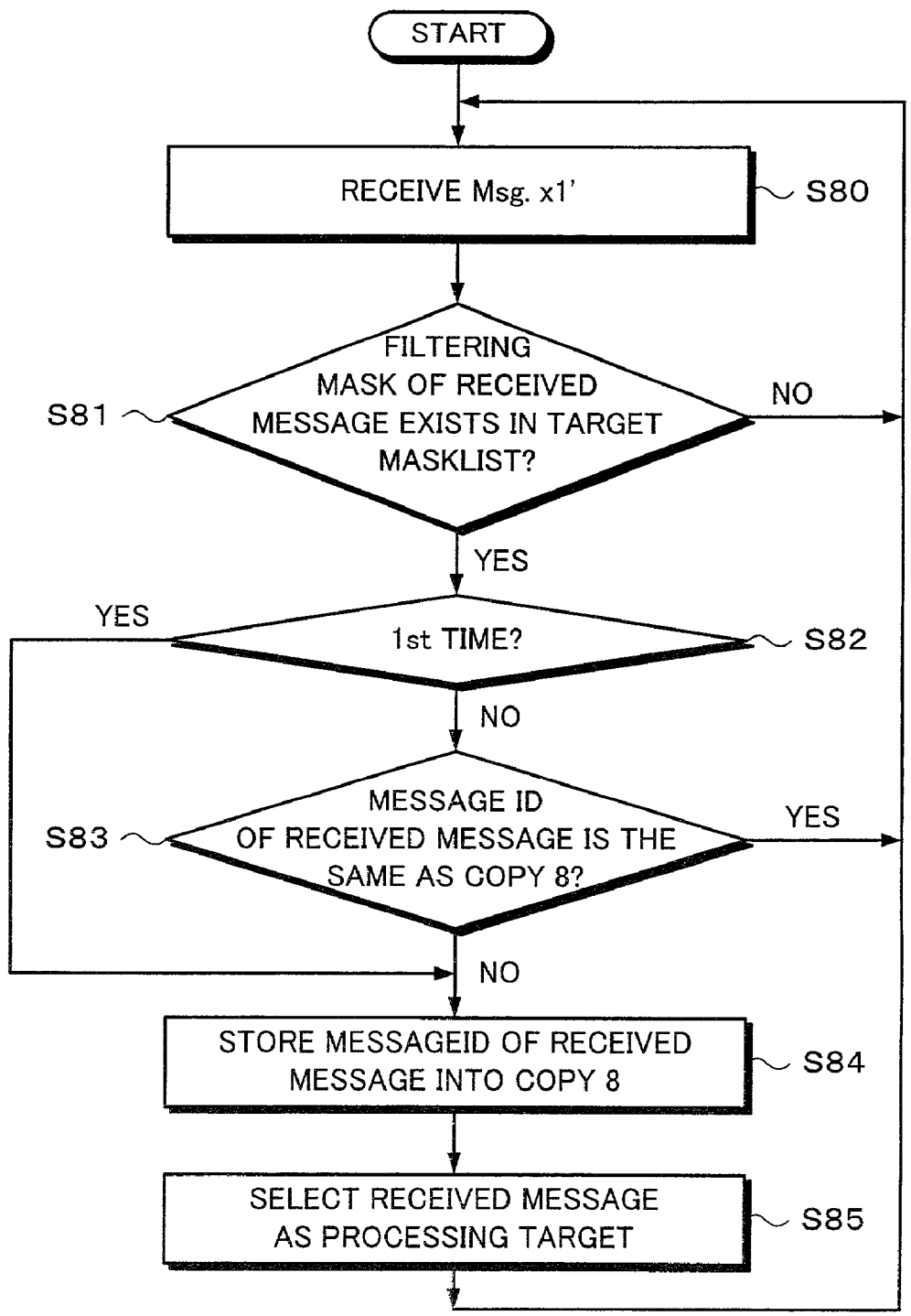
FIG. 22 is a flowchart showing a process for selectively receiving broadcasted leaf updating information Msg.x1'on the basis of the target mask list.

FIG. 22 is a flowchart showing processes for selectively receiving the broadcasted leaf updating information Msg.x1' on the basis of the target mask list formed in accordance with the flowchart of FIG. 21. The reception side replicator 17 selectively receives the leaf updating information Msg.x1' having the filtering mask listed in the target mask list from the leaf updating information Msg.1' broadcasted by the broadcast network 2. The process in step S32 in the flowchart of FIG. 14 mentioned above is executed by the leaf updating information Msg.x1' which was selectively received.

In FIG. 22, first, in step S80, the leaf updating information Msg.x1' broadcasted by the broadcast network 2 is received by the reception side replicator 17. In the reception side replicator 17, whether the filtering mask shown in the received leaf updating information Msg.1' exists in the target mask list or not is discriminated with reference to the target mask list stored in the memory medium. If the filtering mask does not exist in the target mask list, the processing routine is returned to step S80.

If it is determined in step S81 that the filtering mask exists in the target mask list, step S82 follows. Whether the reception in step S80 is the first reception of the leaf updating information Msg.x1' or not is discriminated. If it is decided that it is the first reception, step S84 follows. The message ID shown in the received leaf updating information Msg.x1' is stored as a copy 8 into, for example, the recording or memory medium such as memory or hard disk which, for example, the reception side replicator 17 has. In next step S85, the received leaf updating information Msg.x1' is selected as a processing target in the reception side replicator 17.

If it is determined in step S82 that the reception of the leaf updating information Msg.x1' in step S80 is not the first reception, step S83 follows. In step S83, whether the message ID of the received leaf updating information Msg.x1' is the same as the message ID stored as a copy 8 into the memory medium in step S84 by the reception of the previous leaf updating information Msg.x1' or not is discriminated.

If it is determined that they are the same, the processing routine is returned to step S80. If it is decided that they are different in step S83, step S84 follows. The message ID of the present received leaf updating information Msg.x1' is stored into the memory medium in place of the previous message ID, and the subsequent processes are executed on the basis of the present received leaf updating information Msg.x1'.

As mentioned above, in the directory structure which is managed by the transmission side server 11, only the portion to which a favor of the user who uses the reception side server 16 has been reflected can be accumulated into the directory structure which is managed by the reception side server 16 and updated. Therefore, the memory medium for accumulating the directory structure can be effectively used in the reception side server 16. At the same time, the storing costs of the directory structure in the reception side server 16 can be suppressed. Further, a processing efficiency of the contents of the reception side server 16 by the reception side client 15 for a search request can be remarkably improved.

Although the assigned mask length which was assigned to each container entry has been set to the variable length in the above description, the invention is not limited to such an example. The assigned mask length can be also set to a fixed length such as a byte unit or the like.

Figure 23:
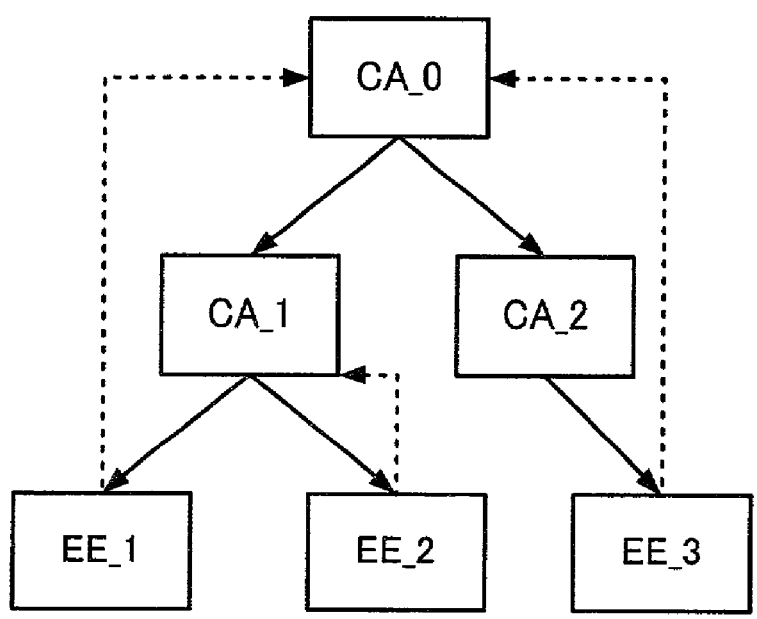
FIG. 23 is a diagram for explaining a certificate authority structure.

An embodiment of the invention will now be described. In the invention, the difference updating system of the broadcasting type of the directory mentioned above is applied to a broadcasting type difference updating system of an actual public key certificate directory. First, the public key certificate directory will be described with reference to FIG. 23. FIG. 23 schematically shows an example of a certificate authority structure as a layer structure comprising the user (subscriber) and the certificate authority.

In FIG. 23, it is assumed that CA_0, CA_1, and CA_2 denote certificate authorities and EE_1, EE_2, and EE_3 indicate end entities (subscribers). An arrow of a solid line denotes that the certificate authority on the source side of an arrow issues a certificate of the public key of the certificate authority on the destination side of the arrow or the end entity.

In the example of FIG. 23, the certificate authorities CA_1, and CA_2 are authenticated by the certificate authority CA_0 and the public key certificate is issued. The end entities EE_1 and EE_2 are authenticated by the certificate authority CA_1 and the public key certificate is issued. Similarly, the end entity EE_3 is authenticated by the certificate authority CA_2 and the public key certificate is issued. On the other hand, the certificate authority CA_0 does not directly authenticate the end entities EE_1, EE_2, and EE_3. As mentioned above, the layer structure is formed between each CA and the end entity.

An arrow shown by a broken line denotes that the end entity on the source side of the arrow has an intimate relation with the CA on the destination side of the arrow and relies on it as a root certificate authority. That is, the end entity on the source side of the arrow of the broken line uses the public key of the certificate authority on the destination side of the arrow as a root public key. In the example of FIG. 23, for instance, the end entity EE_1 has an intimate relation with the certificate authority CA_0 and the end entity EE_1 uses the public key of the CA_0 as a root public key.

For example, a case where the end entity EE_1 obtains the public key of the end entity EE_2 will now be considered. In this case, the end entity EE_1 processes certificate passes of the following two certificates. That is, the first certificate pass is a pass for obtaining the certificate of the certificate authority CA_1 issued by the certificate authority CA_0. The second certificate pass is a pass for obtaining the certificate of the end entity EE_2 issued by the certificate authority CA_1.

That is, since the end entity EE_1 does not know whether the certificate authority CA_1 which authenticates the end entity EE_2 is reliable or not, it is necessary to confirm the authentication of the certificate authority CA_1 by tracing to the certificate authority CA_0 having a reliable relation with the end entity EE_1 itself.

As another example, a case where the end entity EE_1 obtains the public key of the end entity EE_3 will be considered. In this case, in a manner similar to the above, since the end entity EE_1 cannot know whether the certificate authority CA_2 which authenticates the end entity EE_3 is reliable or not, the end entity EE_1 processes certificate passes of the following two certificates. That is, the first certificate pass is a pass for obtaining the certificate of the certificate authority CA_2 issued by the certificate authority CA_0. The second pass is a pass for obtaining the certificate of the end entity EE_3 issued by the certificate authority CA_2.

As further another example, a case where the end entity EE_2 obtains the public key of the end entity EE_1 will now be considered. In this case, the end entities EE_1 and EE_2 are authenticated by the common certificate authority CA_1. Therefore, it is sufficient that the end entity EE_2 merely obtains the certificate of the end entity EE_1 issued by the certificate authority CA_1.

As will be also understood from FIG. 23, the certificate authority structure can be made to correspond to the directory tree managed by the transmission side directory server 11. FIGS. 24A and 24B show a correspondence relation of an example between the certificate authority structure and the directory tree. Each layer of the certificate authority structure shown in FIG. 24A is made to correspond to each layer of the directory tree shown in FIG. 24B. That is, the certificate authorities CA_0, CA_1, and CA_2 in certificate authority structure are made to correspond to container entries 100, 101, and 102 in the directory tree, respectively. The end entities EE_1, EE_2, and EE_3 in certificate authority structure are made to correspond to leaf entries 110, 111, and 112, respectively.

The entry name of each entry in the directory tree can be also assigned in correspondence to the certificate authority structure. For example, if the naming method mentioned in conjunction with FIG. 3 is similarly used, the entry name of the container entry 100 is set to the entry name CA_0 on the basis of the corresponding certificate authority CA_0. The container entry 101 corresponds to the certificate authority CA_1 obtained by tracing the layer structure from the certificate authority CA_0 in the certificate authority structure. Therefore, the entry name CA_0. CA_1 is assigned to the container entry 101. Similarly, the leaf entry 110 corresponds to the end entity EE_1 obtained by further tracing the layer structure from the certificate authority CA_1 in the certificate authority structure. Therefore, the entry name CA_0. CA_1. EE_1 is assigned to the leaf entry 110. The entry name can be also similarly assigned to the other entries in correspondence to the certificate authority structure.

The entry corresponding to the certificate authority in the certificate authority structure (hereinafter, such an entry is referred to as a CA entry) has the following two attributes. One of them is an attribute for storing a serial number of the latest public key certificate of the corresponding CA. In this instance, an attribute name of this attribute is set to "PublicKeyCertificateSerialNumber" and an attribute value is set to the serial number itself.

The other is an attribute for storing the latest public key certificate of the corresponding CA or a method of obtaining the latest public key certificate. An attribute name of this attribute is set to "LatestPublicKeyCertificate" here and an attribute value is set to the latest public key certificate itself or a method of obtaining the latest public key certificate. The method of obtaining the latest public key certificate is shown by, for example, a URL where the public key certificate has been put.

The entry corresponding to the end entity in the certificate authority structure (hereinafter, such an entry is referred to as an EE entry) similarly has the following two attributes. One of them is an attribute for storing the serial number of the latest public key certificate of the corresponding end entity. In this instance, an attribute name of this attribute is set to "PublicKeyCertificateSerialNumber" and an attribute value is set to the serial number itself.

The other is an attribute for storing the latest public key certificate of the corresponding end entity or a method of obtaining the latest public key certificate. An attribute name of this attribute is set to "LatestPublicKeyCertificate" and an attribute value is set to the latest public key certificate itself or a method of obtaining the latest public key certificate. The method of obtaining the latest public key certificate is shown by, for example, a URL where the public key certificate has been put.

As mentioned above, according to the embodiment, two kinds of forms such as case of directly storing the latest public key certificate and case of storing the information for obtaining the latest public key certificate are provided for the attribute of the entry. By enabling the two kinds of information to be stored for the entry attribute as mentioned above, the broadcast network resources can be effectively used.

Generally, a data size of the public key certificate is much larger than that of the information (for example, URL or the like) for obtaining the certificate. Therefore, when the directory structure has an extremely large number of directory entries, if the latest public key certificate corresponding to such a large number of directory entries is periodically broadcasted, the band is remarkably suppressed. However, if the whole information for obtaining the public key certificates is broadcasted in order to save the band, when the latest public key on the reception side is referred to, the process for obtaining the public key certificate through the communication network is certainly performed and a traffic of the communication network is suppressed.

Therefore, to utilize an advantage of the instantaneous wide band distribution through the broadcast network, the following method is used in the embodiment of the invention. That is, for example, if a certain public key certificate is lapsed, the public key certificate which was newly issued is stored into the attribute "LatestPublicKeyCertificate" of the corresponding entry and the serial number of the public key certificate is stored into "PublicKeyCertificateSerialNumber" and they are broadcasted as updating information. When a predetermined time has expired, the public key certificate is put into the address designated by a certain URL. The contents of the attribute "LatestPublicKeyCertificate" of the entry are replaced into the URL and broadcasted as updating information. By this method, the band can be effectively used.

Figure 25:
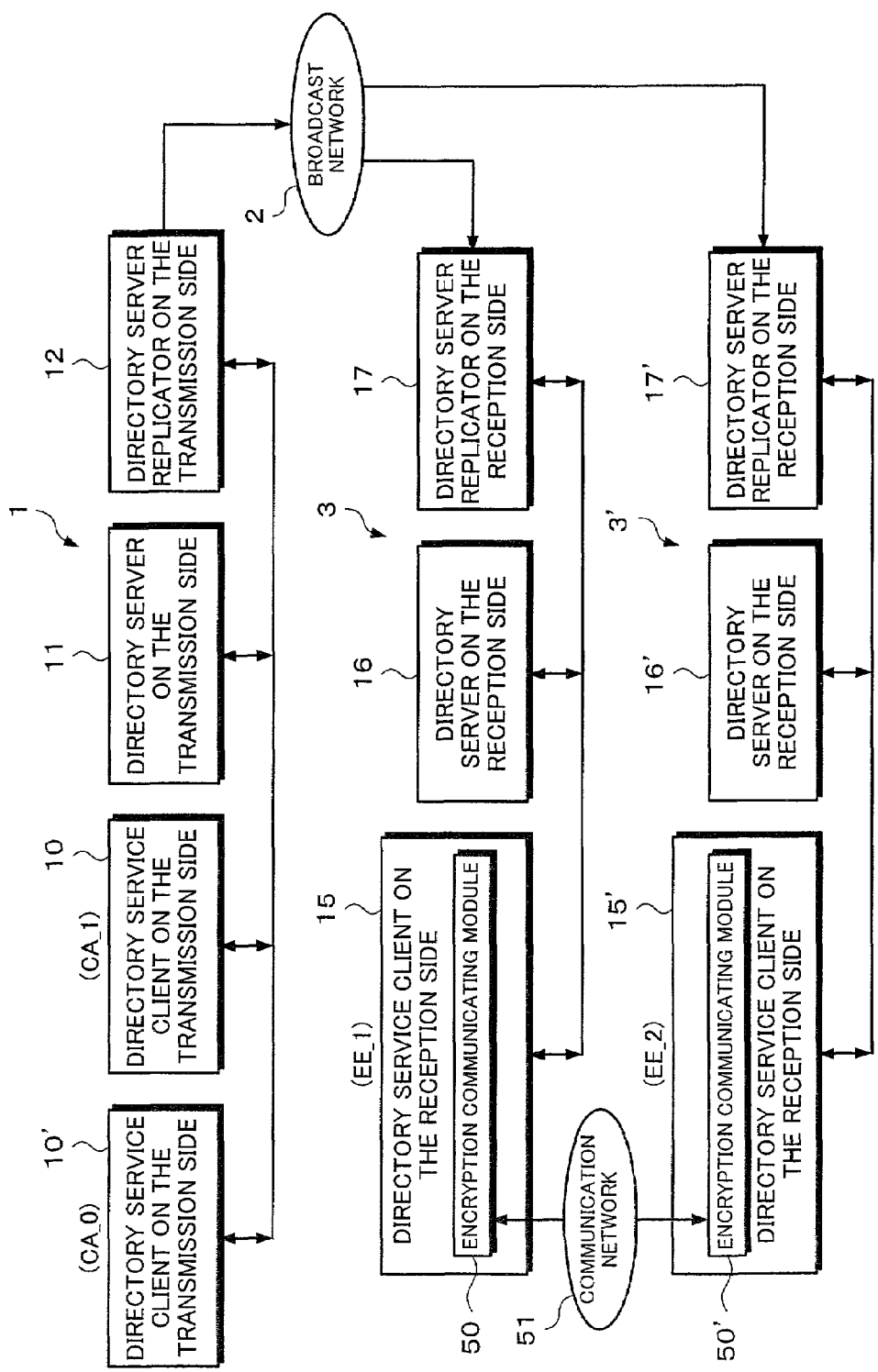
FIG. 25 is a schematic diagram showing an example of a system which can be applied to the embodiment.

FIG. 25 shows an example of a system which can be applied to the embodiment. The example of FIG. 25 is an example in which two end entities are concerned with encryption communication such as encryption E-mail or the like. In the diagram, the certificate authorities CA_0 and CA_1 are concerned. In FIG. 25, portions common to those in FIG. 1 mentioned above are designated by the same reference numerals and their detailed description is omitted.

In FIG. 25, a reception side replicator 17', a reception side server 16', and a reception side client 15' which serve as a reception side 3' are substantially equivalent to the reception side replicator 17, reception side server 16, and reception side client 15 which serve as a reception side 3, and manage a copy of the directory tree which is managed by the transmission side server 11 on the transmission side 1 through the broadcast network 2.

It is now assumed that the reception side clients 15 and 15' correspond to the end entities EE_1 and EE_2 described in FIGS. 23, 24A, and 24B, respectively. The reception side clients 15 and 15' have encryption communicating modules 50 and 50' comprising, for example, software. The reception side clients 15 and 15' mutually perform encryption communication through a communication network 51 by using the encryption communicating modules 50 and 50'.

Further, on the transmission side, the transmission side clients 10 and 10' exist and the transmission side client 10' can update the contents of the directory tree which is managed by the transmission side server 11 in a manner similar to the transmission side client 10. The transmission side clients 10 and 10' correspond to the certificate authorities CA_0 and CA_1 in the certificate authority layer described in FIGS. 23 to 24B.

Although two reception sides 3 and 3' have been shown as reception sides in FIG. 25, actually, a further larger number of reception side constructions exist and such a number of reception side constructions can mutually communicate through the communication network 51. Although two transmission side clients 10 and 10' have been shown here as transmission side clients, a further larger number of transmission side clients actually exist.

Figure 26:
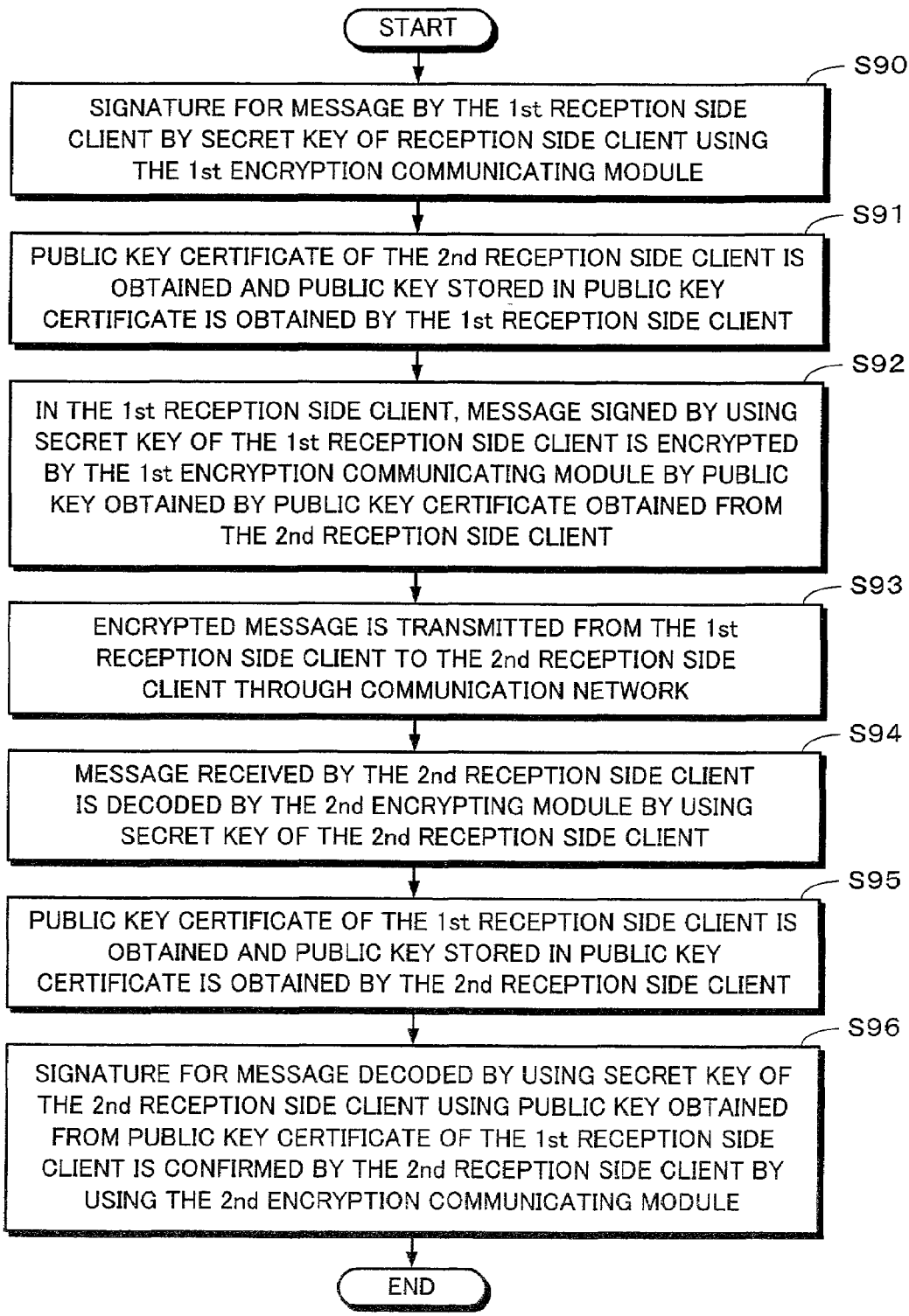
FIG. 26 is a flowchart showing a procedure of an example of encryption communication which is performed between reception side clients.
Figure 28B:
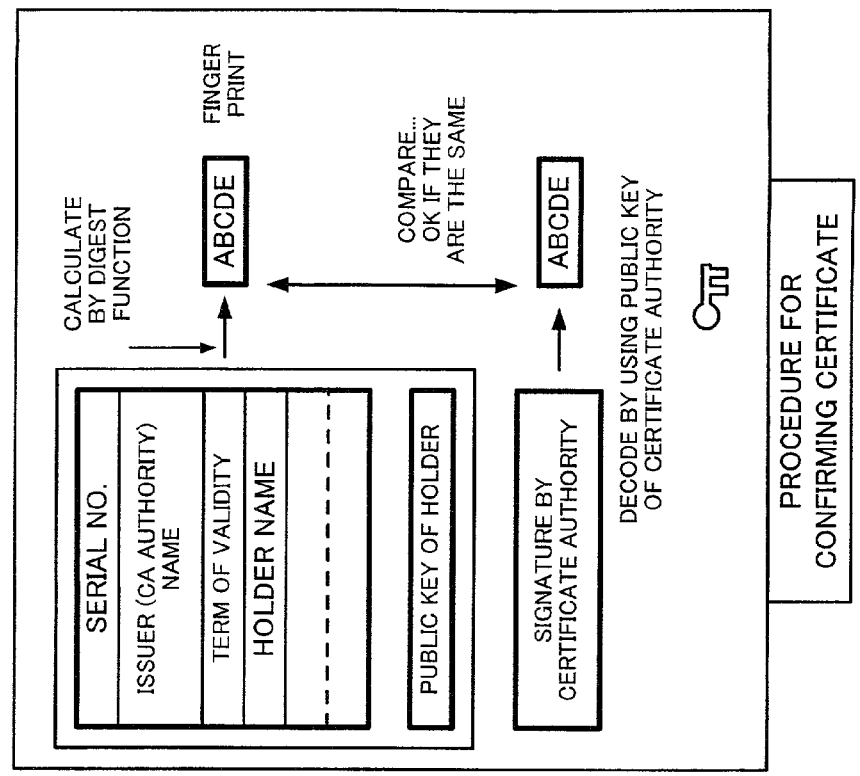
FIGS. 28A and 28B are diagrams for explaining structures of public key certificates.
Figure 28A:
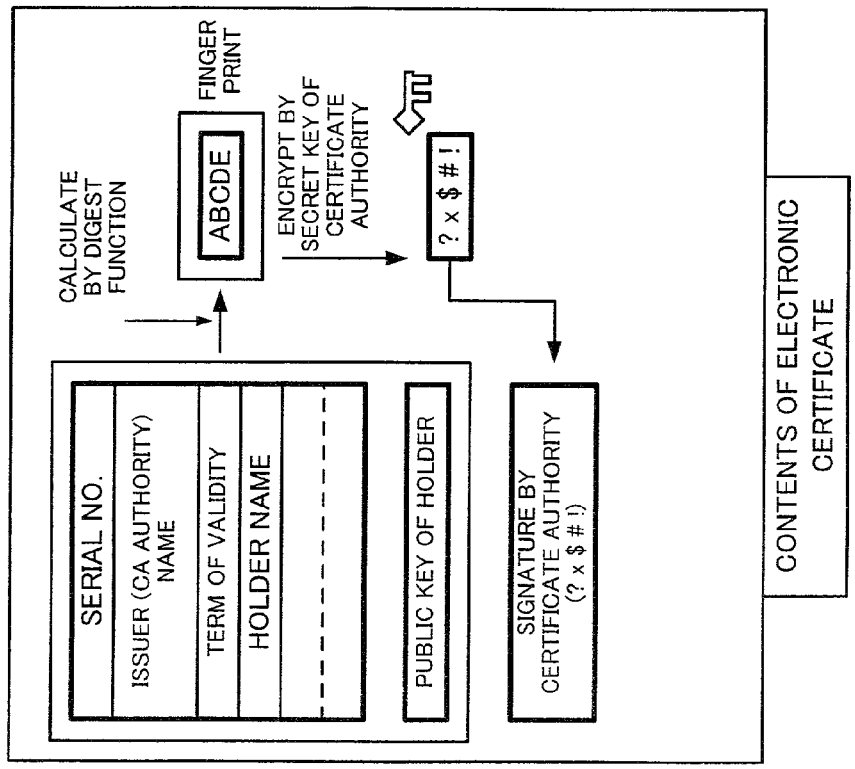

FIG. 26 is a flowchart showing a procedure of an example of the encryption communication which is executed between the reception side clients 15 and 15'. In FIG. 26, the reception side replicators 17 and 17' are referred to as first and second reception side replicators, and the encryption communicating modules 50 and 50' are referred to as first and second encryption communicating modules, respectively.

First, prior to the processes in this flowchart, it is assumed that each of the reception side clients 15 and 15' forms a pair of self secret key and public key. It is also assumed that the reception side client 15, namely, the end entity EE_1 receives the public key certificate issued from the transmission side client 10', that is, from the certificate authority CA_1 with respect to the self public key. At this time, in consideration of the fact that the certificate authority CA_0 issues the certificate pass mentioned in conjunction with FIG. 23, that is, the certificate to the certificate authority CA_1 and the certificate authority CA_1 issues the certificate of the end entity EE_2, it is assumed that the public key certificate is previously issued from the certificate authority CA_0, namely, from the transmission side client 10 to the certificate authority CA_1 as a prerequisite.

Similarly, it is assumed that the public key certificate is issued from the transmission side client 10', namely, from the certificate authority CA_1 to the reception side client 15', that is, to the end entity EE_2 with respect to the self public key.

Each of the public key certificates regarding the public key of each of the reception side clients 15 and 15' is stored at a location where it can be accessed by both of the reception side clients 15 and 15', for example, into a certain Web site on the Internet or previously mutually exchanged, thereby enabling them to be used mutually as necessary.

First, in step S90, in the reception side client 15, the encryption communicating module 50 is used, and a signature is made to a message by the secret key of the reception side client 15. In next step S91, the public key certificate of the reception side client 15' is obtained by the reception side client 15, and the public key stored in the obtained public key certificate is obtained. As a prerequisite of the process in step S91, the public key certificate of the transmission side client 10' is obtained by the reception side client 15, and the public key stored there has already been obtained. In step S92, in the reception side client 15, the encryption communicating module 50 is used and the message signed in step S90 is encrypted by the public key obtained in step S91.

The message encrypted in step S92 is transmitted to the reception side client 15' through the communication network 51 in step S93. In the reception side client 15', the message transmitted from the reception side client 15 is received, and the received message is decoded by the secret key of the reception side client 15' by using the encryption communicating module 50'. The decoded message has already been signed by using the secret key of the reception side client 15 in step S90.

In next step S95, the public key certificate of the reception side client 15 is obtained by the reception side client 15', and the public key stored in the obtained public key certificate is derived. In step S96, the encryption communicating module 50' is used by the reception side client 15', and the signature for the message decoded in step S94 is confirmed by the public key obtained in step S95.

In the foregoing flowchart, when the public key is obtained in steps S91 and S95, the reception side clients 15 and 15' have to confirm that the public keys to be obtained are based on the valid public key certificates which are not lapsed. Such a confirmation can be performed by inquiring of the CA which issued those valid public key certificates. However, generally, in a certificate authority in which the number of public key certificates to be issued is large, there are problems such that a load of inquiry increases and response performance remarkably deteriorates, so that in many cases, the process for confirming the validity in an on-line manner is impossible.

In the embodiment of the invention, therefore, each of the reception side clients 15 and 15' inquires of the directory which is managed by the reception side servers 16 and 16' installed in its own local environment instead of inquiring of the relevant certificate authority with respect to the validity of the public key which is used, respectively. As reception side servers 16 and 16' installed in the local environments of the reception side clients 15 and 15', for example, a telephone line collecting apparatus which is installed on an LAN (Local Area Network) in a home, an apartment, or the like, a head end of a cable television network, or the like can be presumed. Thus, the concentration of the inquiries to the CA which issued the public key certificate can be distributed.

To replace the foregoing inquiry to the CA with the inquiry in the local environment and perform it, it is necessary to update the following information. First, in the reception side server 16, it is necessary that the information showing whether the public key certificate of the reception side client 15', that is, the end entity EE_2 is valid or not has been updated. In this example, the reception side client 15, that is, the end entity EE_1 does not have an intimate relation with the certificate authority CA_1 which issues the public key certificate to the end entity EE_2 in accordance with the foregoing certificate pass. Therefore, in the reception side server 16, it is also necessary that the information showing whether the public key certificate of the certificate authority CA_1 which issues the public key certificate to the transmission side client 10', that is, to the end entity EE_2 is valid or not has been updated to the latest information.

Second, in the reception side server 16', it is necessary that the information indicating whether the public key certificate of the reception side client 15, that is, the end entity EE_1 is valid or not has been updated to the latest information.

Whether the public key certificate is valid or not, that is, whether the public key certificate is lapsed or not can be discriminated by comparing the public key certificate with the latest public key certificate corresponding to such a public key certificate and checking whether those serial numbers coincide or not. In the invention, since the serial number of the public key certificate which was newly issued is stored into the entry attribute "PublicKeyCertificateSerialNumber", by checking the entry attribute, whether the public key certificate is valid or not can be known.

As shown in FIGS. 24A and 24B, the certificate authority structure shown in FIG. 23 and the directory entries of the reception side clients 15 and 15' have been made to correspond to each other. Therefore, in the directory which is managed by the reception side server 16, it is necessary to pay attention to the updating information of the container entry 101 (entry name CA_0. CA_1) and the leaf entry 111 (entry name CA_0. CA_1. EE_2). Similarly, with respect to the directory which is managed by the reception side server 16', attention has to be paid to the updating information of the leaf entry 110.

In each of the reception side servers 15 and 15', the upper container entry of the entry serving as a target to which attention is paid is selected as a target container entry of the filtering mask. The selection of the target container entry of the filtering mask is performed in step S74 in accordance with the flowchart of FIG. 21. The filtering mask corresponding to the selected container entry is stored into each target mask list.

Which filtering mask is stored into each target mask list will be more specifically explained with reference to FIGS. 27A and 27B. In FIGS. 27A and 27B, a rectangle with a hatched line indicates an entry which becomes a target for obtaining the public key certificate. A rectangle shown by a broken line indicates a container entry corresponding to the filtering mask. FIGS. 27A and 27B show entries of the filtering targets in the reception side servers 16 and 16'.

As shown in FIG. 27A, the entries of the filtering targets in the reception side server 16 are the container entry 101 of the entry name CA_0. CA_1 and the leaf entry 111 of the entry name CA_0. CA_1. EE_2. By the reception side replicator 17, the filtering masks showing the entries 101 and 111 are stored into the target mask list. The target mask list is stored into, for example, the memory medium which the reception side replicator 17 has.

Similarly, the entries of the filtering targets in the reception side server 16' are the leaf entry 110 of the entry name CA_0. CA_1. EE_1 as shown in FIG. 27B. By the reception side replicator 17, the filtering masks showing the entry 110 are stored into the target mask list.

It is necessary that the directory information which is managed by the transmission side server 11 and the directory information which is managed by the reception side servers 16 and 16' are synchronized. In the embodiment, as mentioned above, the directory information which is managed by the reception side servers 16 and 16' is updated by the differential updating information of the directory information which is broadcasted at the timing that is determined by the timer set to the predetermined time, so that the synchronization between the transmission side and the reception side is obtained.

At this time, the synchronization between the transmission side and the reception side can be obtained step by step. For example, the updating by the differential updating information is performed at the foregoing timing, the broadcast of all of the directory structures is performed at a longer period, and the updating of the reception side servers 16 and 16' can be performed. Further, the reception side servers 16 and 16' are connected to the transmission side server 11 by a communication line which can perform bidirectional communication. On the side of the reception side servers 16 and 16', with respect to the information stored in the target mask list, the latest information is always requested to the transmission side server 11. On the transmission side server 11, the corresponding directory structure can be transmitted in response to such a request.

As described above, according to the embodiment of the invention, by using the target mask list, only the information of the entries which are frequently accessed by the reception side clients 15 and 15' in the directory tree construction which is managed by the transmission side server 11 can be accumulated and updated in the contents of the directory trees that are managed by the reception side servers 16 and 16' as mentioned above. Thus, there are effects such that the storing costs of the directory trees in the reception side servers 16 and 16' can be suppressed and the memory medium can be effectively used.

According to the invention, the certificate authority structure as a layer structure comprising the certificate authorities and the end entities and the directory trees which are managed by the transmission side directory server and the reception side directory server are made to correspond, and the target mask list is formed in correspondence to the certificate pass for obtaining the public key certificate in the certificate authority structure. Therefore, there is an effect that the processing efficiency for the search requests of the lapsed information of the public key certificate from a plurality of reception side directory servers for the contents of a plurality of reception side directory servers can be remarkably improved.

The present invention is not limited to the foregoing embodiments but many modifications and variations are possible within the spirit and scope of the appended claims of the invention.

What is claimed is:

1. A transmitting apparatus for transmitting a layer structure of a directory which manages public key certificate information in a layer manner, comprising:
    managing means for making certificate authority information correspond to a container entry which can store its own subordinate information, making end entity information correspond to a leaf entry which is under domination of said container entry and cannot store its own subordinate information, and managing a layer structure of a directory constructed by said container entry and said leaf entry;
    first detecting means for selectively detecting a change of said layer structure of said directory which is managed by said managing means as a function of a predetermined mask and obtaining first differential information constructed by a difference of the change of the layer structure of said directory;
    second detecting means for detecting a change of said end entity information of said leaf entry which is managed by said managing means and obtaining second differential information constructed by a difference of the change of end entity information of said leaf entry; and
    broadcasting means for broadcasting said first differential information detected by said first detecting means and said second differential information detected by said second detecting means,
    wherein information which can obtain latest public key certificate information and lapse information of said latest public key certificate information are stored into said container entry and/or said leaf entry at a predetermined time interval, and
    wherein said lapse information includes a method of obtaining said latest public key certificate information.

2. An apparatus according to claim 1, wherein said lapse information is a serial number of said public key certificate information.

3. An apparatus according to claim 1, wherein one of said latest public key certificate information and the information for obtaining said latest public key certificate information can be selected and stored into attributes of said container entry and/or said leaf entry.

4. An apparatus according to claim 3, wherein the information which is stored into said attributes can be changed between said latest public key certificate information and the information for obtaining said latest public key certificate information in accordance with an elapsed time from an updating event in which said difference has been detected by said detecting means.

5. A transmitting method of transmitting alayer structure of a directory which manages public key certificate information in a layer manner, comprising:
    a managing step of making certificate authority information correspond to a container entry which can store its own subordinate information, making end entity information correspond to a leaf entry which is under domination of said container entry and cannot store its own subordinate information, and managing a layer structure of a directory constructed by said container entry and said leaf entry;

a first detecting step of selectively detecting a change of said layer structure of said directory which is managed by said first managing step as a function of a predetermined mask and obtaining first differential information constructed by a difference of the change of said layer structure of said directory; and a second detecting step for detecting a change of said end entity information of said leaf entry which is managed by said managing means and obtaining second differential information constructed by a difference of the change of end entity information of said leaf entry;

a transmitting step of transmitting said first differential information detected by said first detecting step and said second differential information detected by second detecting step, wherein information which can obtain latest public key certificate information and lapse information of said latest public key certificate information are stored into said container entry and/or said leaf entry at a predetermined time interval, and wherein said lapse information includes a method of obtaining said latest public key certificate information.

6. A receiving apparatus for receiving a transmitted layer structure of a directory which manages public key certificate information in a layer manner, comprising:

receiving means for making transmitted certificate authority information correspond to a container entry which can store its own subordinate information, making end entity information correspond to a leaf entry which is under domination of said container entry and cannot store its own subordinate information, and receiving differential information comprising a difference of a change of a layer structure of a directory which is constructed by said container entry and said leaf entry and obtained on the basis of a detection result obtained by selectively detecting the change of said layer structure of said directory as a function of a predetermined mask, and receiving second differential information comprising a difference of a change of end entity information of said leaf entry;

managing means for managing said layer structure of said directory constructed on the basis of said first differential information and said second differential information received by said receiving means; and changing means for selectively fetching said first differential information and said second differential information and changing said layer structure of said directory which is managed by said managing means, wherein information which can obtain latest public key certificate information and lapse information of said latest public key certificate information are stored into said container entry and/or said leaf entry and transmitted at a predetermined time interval, and wherein said lapse information includes a method of obtaining said latest public key certificate information.

7. An apparatus according to claim 6, wherein said lapse information is a serial number of said public key certificate information.

8. An apparatus according to claim 6, wherein said changing means selectively fetches updating information of said container entry and/or said leaf entry corresponding to a certificate information pass for obtaining said public key certificate information.

9. A receiving method of receiving a transmitted layer structure of a directory which manages public key certificate information in a layer manner, comprising:

a receiving step of making transmitted certificate authority information correspond to a container entry which can store its own subordinate information, making end entity information correspond to a leaf entry which is under domination of said container entry and cannot store its own subordinate information, and receiving first differential information comprising a difference of a change of a layer structure of a directory which is constructed by said container entry and said leaf entry and obtained on the basis of a selective detection result obtained by detecting the change of said layer structure of said directory as a function of a predetermined mask, and receiving second differential information comprising a difference of a change of end entity information of said leaf entry;

a managing step of managing said layer structure of said directory constructed on the basis of said first differential information and said second differential information received by said receiving step; and a changing step of selectively fetching said first differential information and said second differential information and changing said layer structure of said directory which is managed by said managing step, wherein information which can obtain latest public key certificate information and lapse information of said latest public key certificate information are stored into said container entry and/or said leaf entry and transmitted at a predetermined time interval, and wherein said lapse information includes a method of obtaining said latest public key certificate information.

10. A transmitting and receiving system for transmitting a layer structure of a directory which manages public key certificate information in a layer manner and receiving the transmitted layer structure of said directory, comprising:

first managing means for making certificate authority information correspond to a container entry which can store its own subordinate information, making end entity information correspond to a leaf entry which is under domination of said container entry and cannot store its own subordinate information, and managing a layer structure of a directory constructed by said container entry and said leaf entry;

first detecting means for selectively detecting a change of said layer structure of said directory which is managed by said first managing means as a function of a predetermined mask and obtaining first differential information constructed by a difference of the change of said layer structure of said directory;

second detecting means for detecting a change of said end entity information of said leaf entry which is managed by said managing means and obtaining second differential information constructed by a difference of the change of end entity information of said leaf entry;

transmitting means for transmitting said first differential information detected by said first detecting means and said second differential detected by said second detecting means;

receiving means for receiving said first differential information and said second differential information transmitted by said transmitting means;

second managing means for managing said layer structure of said first directory constructed on the basis of said first differential information and said second differential information received by said receiving means; and changing means for selectively fetching said first differential information and said second differential information and changing said layer structure of said directory which is managed by said second managing means, wherein information which can obtain latest public key certificate information and lapse information of said latest public key certificate information are stored into said container entry and/or said leaf entry at a predetermined time interval, and wherein said lapse information includes a method of obtaining said latest public key certificate information.

11. A system according to claim 10, wherein said lapse information is a serial number of said public key certificate information.

12. A system according to claim 10, wherein one of said latest public key certificate information and the information for obtaining said latest public key certificate information can be selected, stored into attributes of said container entry and/or said leaf entry, and transmitted.

13. A system according to claim 12, wherein the information which is stored into said attributes can be changed between said latest public key certificate information and the information for obtaining said latest public key certificate information in accordance with an elapsed time from an updating event in which said difference has been detected by said detecting means and transmitted.

14. A system according to claim 10, wherein said changing means selectively fetches updating information of said container entry and/or said leaf entry corresponding to a certificate information pass for obtaining said public key certificate information.

15. A transmitting and receiving method of transmitting a layer structure of a directory which manages public key certificate information in a layer manner and receiving the transmitted layer structure of said directory, comprising:

a first managing step of making certificate authority information correspond to a container entry which can store its own subordinate information, making end entity information correspond to a leaf entry which is under domination of said container entry and cannot store its own subordinate information, and managing a layer structure of a directory constructed by said container entry and said leaf entry;

a first detecting step of selectively detecting a change of said layer structure of said directory which is managed by said first managing step as a function of a predetermined mask and obtaining first differential information constructed by a difference of the change of said layer structure of said directory;

a second detecting step for detecting a change of said end entity information of said leaf entry which is managed by said managing means and obtaining second differential information constructed by a difference of the change of end entity information of said leaf entry;

a transmitting step of transmitting said first differential information detected by said first detecting step and said second differential information detected by second detecting step;

a receiving step of receiving said first differential information and said second differential information transmitted by said transmitting step;

a second managing step of managing said layer structure of said directory constructed on the basis of said first differential information and said second differential information received by said receiving step; and a changing step of selectively fetching said first differential information and said second differential information and changing said layer structure of said directory which is managed by said second managing step, wherein information which can obtain latest public key certificate information and lapse information of said latest public key certificate information are stored into said container entry and/or said leaf entry at a predetermined time interval, and wherein said lapse information includes a method of obtaining said latest public key certificate information.

* * * * *